US009953060B2

United States Patent
Cherukuri

(10) Patent No.: US 9,953,060 B2
(45) Date of Patent: *Apr. 24, 2018

(54) PERSONALIZED ACTIVITY DATA GATHERING BASED ON MULTI-VARIABLE USER INPUT AND MULTI-DIMENSIONAL SCHEMA

(71) Applicant: Maruthi Siva P Cherukuri, Allston, MA (US)

(72) Inventor: Maruthi Siva P Cherukuri, Allston, MA (US)

(*) Notice: Subject to any disclaimer, the term of this patent is extended or adjusted under 35 U.S.C. 154(b) by 255 days.

This patent is subject to a terminal disclaimer.

(21) Appl. No.: 14/718,980

(22) Filed: May 21, 2015

(65) Prior Publication Data

US 2015/0331914 A1  Nov. 19, 2015

Related U.S. Application Data

(63) Continuation-in-part of application No. 14/464,620, filed on Aug. 20, 2014.

(Continued)

(51) Int. Cl.
*G06F 17/30* (2006.01)
*H04L 29/08* (2006.01)

(52) U.S. Cl.
CPC .... *G06F 17/30519* (2013.01); *G06F 17/3053* (2013.01); *G06F 17/30312* (2013.01);
(Continued)

(58) Field of Classification Search
CPC ......... G06F 17/30519; G06F 17/30699; G06F 17/30598; G06F 17/30958;
(Continued)

(56) References Cited

U.S. PATENT DOCUMENTS 5,819,284 A  10/1998  Farber
7,577,718 B2  8/2009  Slawson
(Continued)

FOREIGN PATENT DOCUMENTS

CN  102819575  12/2012
CN  103049528  4/2013

OTHER PUBLICATIONS

Written Opinion of the International Searching Authority corresponding to co-pending International Patent Application No. PCT/US2016/033337, ISA/US, dated Jul. 20, 2016, 5 pages.
(Continued)

*Primary Examiner* — Jorge A Casanova

(57) ABSTRACT

A personalized activity data retrieval system and method provides users a platform to search activity data based on multi-variable user input. The present invention provides a search method where the system searches a database to gather activity information based on user interests and user attributes. A customization of search results are applied multi-dimensionally to customize the search result based on user interest and user attributes. As such, the search results are personalized to meet the user's search objective. Searches conducted with the same topic can be returned with different results for different users having varying attributes. Search results are more progressive such that they are more usable and the granularity of the customization increases.

50 Claims, 25 Drawing Sheets

Related U.S. Application Data

(60) Provisional application No. 61/973,233, filed on Mar. 31, 2014.

(52) U.S. Cl.
CPC .. *G06F 17/30528* (2013.01); *G06F 17/30554* (2013.01); *G06F 17/30598* (2013.01); *G06F 17/30699* (2013.01); *G06F 17/30867* (2013.01); *G06F 17/30958* (2013.01); *H04L 67/02* (2013.01); *H04L 67/22* (2013.01); *H04L 67/306* (2013.01)

(58) Field of Classification Search
CPC ........... G06F 17/30312; G06F 17/3053; G06F 17/30867; G06F 17/30554; G06F 17/30528; H04L 67/02; H04L 67/22; H04L 67/306
See application file for complete search history.

(56) References Cited

U.S. PATENT DOCUMENTS

| | | |
|---|---|---|
| 7,693,827 B2 | 4/2010 | Zamir |
| 8,516,374 B2 | 8/2013 | Fleischman |
| 8,635,216 B1 | 1/2014 | Hepworth |
| 2003/0216943 A1 | 11/2003 | McPhee |
| 2005/0004987 A1 | 1/2005 | Bangor |
| 2006/0074883 A1 | 4/2006 | Teevan |
| 2008/0104030 A1 | 5/2008 | Choi |
| 2009/0043739 A1 | 2/2009 | Choi |
| 2010/0082434 A1 | 4/2010 | Chen |
| 2011/0320441 A1 | 12/2011 | Lee |
| 2012/0130969 A1 | 5/2012 | Wong |
| 2013/0066449 A1 | 3/2013 | Verstegen |
| 2013/0218667 A1 | 8/2013 | Mohamed |
| 2014/0018946 A1 | 1/2014 | Martikka |

OTHER PUBLICATIONS

International Search Report corresponding to co-pending Intenational Patent Application No. PCT/US2016/033337, ISA/US, dated Jul. 20, 2016, 2 pages.

PERSONALIZED ACTIVITY DATA GATHERING BASED ON MULTI-VARIABLE USER INPUT AND MULTI-DIMENSIONAL SCHEMA

CROSS-REFERENCE TO RELATED APPLICATIONS

This application is continuation in part to application Ser. No. 14/464,620 filed on Aug. 20, 2014, which claims priority to Provisional Application No. 61/973,233 filed on Mar. 31, 2014, all of which are herein incorporated by reference.

BACKGROUND

Technical Field

The present invention relates generally to a system and method for gathering or extracting information in a network. More particularly, the present invention relates to system and method for gathering activity data based on a user's interest and attributes. Also, the present invention relates to information management technique and presentation of information. It particularly relates to personalizing information with a multi-dimensional ranking method.

Description of Related Art

It is common nowadays to use the Internet as a primary source of information. The amount of information being shared on the internet has seen rapid growth since the emergence of the internet. It is an effective channel of information for a user to search any information needed. As the number of users and amount of information grow, there have been attempts to organize the information and customize the information per user's preference. Most common attempt is to tag information with certain keywords.

Most of the search platforms provide keyword-based searches where results are presented to users based on certain order of relevancy. More often than not, the results of the searches are not customized to accommodate particular needs of each user. Users, having different objectives in searching for the same topic, may receive the same result regardless of the differences in their objectives.

Current search engines do not provide many options to customize how searches are done or how they are presented. When a user searches for an activity or how-to information, keywords are entered and the search is initiated based on the keyword without considering the user's intention for the search. When new information is introduced in the database, a new search needs to be conducted to gather the new information. In addition, users may not be able to gather certain information when the keywords being searched do not match with the information.

Therefore, what is needed is a system and method that provides more usability to a user when gathering information from a network or the Internet and a search result that encompasses user's search objective at a granular level. Also what is needed is a search platform that provides ease of information management and sharing based on multiple users' preferences.

SUMMARY

The subject matter of this application may involve, in some cases, interrelated products, alternative solutions to a particular problem, and/or a plurality of different uses of a single system or article.

The present invention overcomes the limitations of the prior art by providing a system and method for gathering personalized activity data based on multi-variable user input and multi-dimensional schema.

An object of the present invention is to provide the user with activity data that reflects the user's interests and objectives that may be used to progressively achieve goals and plan activities.

Another objective of the present invention is to provide the user with customized search result that suits the user's search objectives.

Yet another objective of the present invention is to provide a search platform that enables multiple users to collaborate in planning and achieving a group's goals and activities.

Yet another objective of the present invention is to provide the user with an activity graph that enables the users to track progress with the activities planned and to receive suggestions of subsequent activities that are related to the general objective and preference of the user.

Still another objective of the present invention is to provide a searching and ranking of the data based on multi-variable user input and multi-dimensional schema to assign ranking to the search results.

Accordingly, the present invention provides a system and method of gathering activity data based on one or more users' objectives and preferences. The present invention provides a system and method for personalized activity data gathering from an information database, such as the internet.

In one aspect, a method of gathering an activity data based on one or more user profiles is provided. The one or more user profiles may be obtained from one or more users, where each of the one or more user profiles comprises a plurality of user interests and a plurality of user attributes. The method beings with identifying the plurality of user interests and the plurality of user attributes received by one or more computerized user interfaces from each of the one or more users. A plurality of action verbs may be generated from the plurality of user interests. The plurality of action verbs may be obtained from a database schema. The database schema may contain a list of action verbs, where each of the list of action verbs has hierarchical link to at least one of the plurality of user interests.

The method may continue with searching a plurality of base contents based on at least one of the plurality of action verbs. The plurality of base contents may be searched from a database, where the database may be in communication with the internet or a user community. The plurality of base contents may be sorted to identify a portion that contains at least one of the plurality of action verbs, thereby providing a plurality of target contents. The plurality of target contents may be indexed to a plurality of categories, where each of the plurality of categories may be defined by each of the plurality of user attributes. Further, the plurality of categories may be structured with a hierarchical structure defined in the database schema.

A rank may be assigned to each of the plurality of target contents based on a plurality of rank factors. The plurality of rank factors may include: a number of the at least one of the plurality of action verbs within each of the plurality of target contents; a number of the at least one of the plurality of action verbs generated commonly from the one or more user profiles, within each of the plurality of target contents; the hierarchical link associated to the at least one of the plurality of action verbs; a number of the plurality of categories indexed to each of the plurality of target contents; a number of the plurality of categories common to the one or more user profiles, indexed to the plurality of target contents; each of a plurality of user relations, where the database schema contains the plurality of user relations defined among each of the one or more users; the hierarchical structure associated to each of the plurality of categories; and an author's user attributes related to the at least one of the plurality of action verbs.

In another aspect, a non-transitory computer readable medium storing executable instruction is provided. The instruction, when executed, may cause a computer processor to perform the method described above.

In yet another aspect, a system for gathering an activity data for one or more users is provided. The system may comprise user devices, an aggregation module, an action verb generator, a search module, a sorting module, a ranking module, and an activity graph module. The user devices may be in communication with a processor via a network, where each of the one or more users may input one or more user profiles, via one or more user interfaces. The user profiles may comprise a plurality of user interests and a plurality of user attributes.

The aggregation module may identify the plurality of user interests and the plurality of user attributes. The action verb generator may generate a plurality of action verbs based on the plurality of user interests from each of the one or more user profiles. The plurality of action verbs may be obtained from a database schema, where a list of action verbs may be stored. Each of the list of action verbs may have a hierarchical link to at least one of the plurality of user interests. The search module may search within a database for a plurality of base contents based on at least one of the plurality of action verbs. The database may communicate with the internet and a user community.

The sorting module may sort the plurality of base contents to identify a portion that contains at least one of the plurality of action verbs, providing a plurality of target contents. Further, the sorting module may index the plurality of target contents to a plurality of categories, where each of the plurality of categories is defined by each of the plurality of user attributes. The plurality of categories may have a hierarchical structure.

The ranking module may assign a rank to each of the plurality of target contents based on a plurality of rank factors. The plurality of rank factors may include: a number of the at least one of the plurality of action verbs within each of the plurality of target contents; a number of the at least one of the plurality of action verbs generated commonly from the one or more user profiles, within each of the plurality of target contents; the hierarchical link associated to the at least one of the plurality of action verbs; a number of the plurality of categories indexed to each of the plurality of target contents; a number of the plurality of categories common to the one or more user profiles, indexed to the plurality of target contents; each of a plurality of user relations, where the database schema contains the plurality of user relations defined among each of the one or more users; the hierarchical structure associated to each of the plurality of categories; and an author's user attributes related to the at least one of the plurality of action verbs.

The activity graph module may provide to each of the one or more users, the activity data. The activity data may comprise the plurality of target contents prioritized based on the assigned rank. The prioritized plurality of target contents may be displayed by the activity graph module on a time-dependent graph.

Many benefits are achieved by way of the present invention over conventional techniques. For example. The present invention helps users to stay up-to-date with the information they are interested in. The users may manage, plan, and track series of ongoing and upcoming activities. In addition, the present invention enables multiple users to collaborate and share information.

These and other objectives, features and advantages of the present invention will become apparent from the following detailed description of illustrative embodiments thereof, which is to be read in connection with the accompanying drawings.

BRIEF DESCRIPTION OF THE DRAWINGS

FIGS. 18A-18G are screen images of example cards.

DETAILED DESCRIPTION

Figure 1:
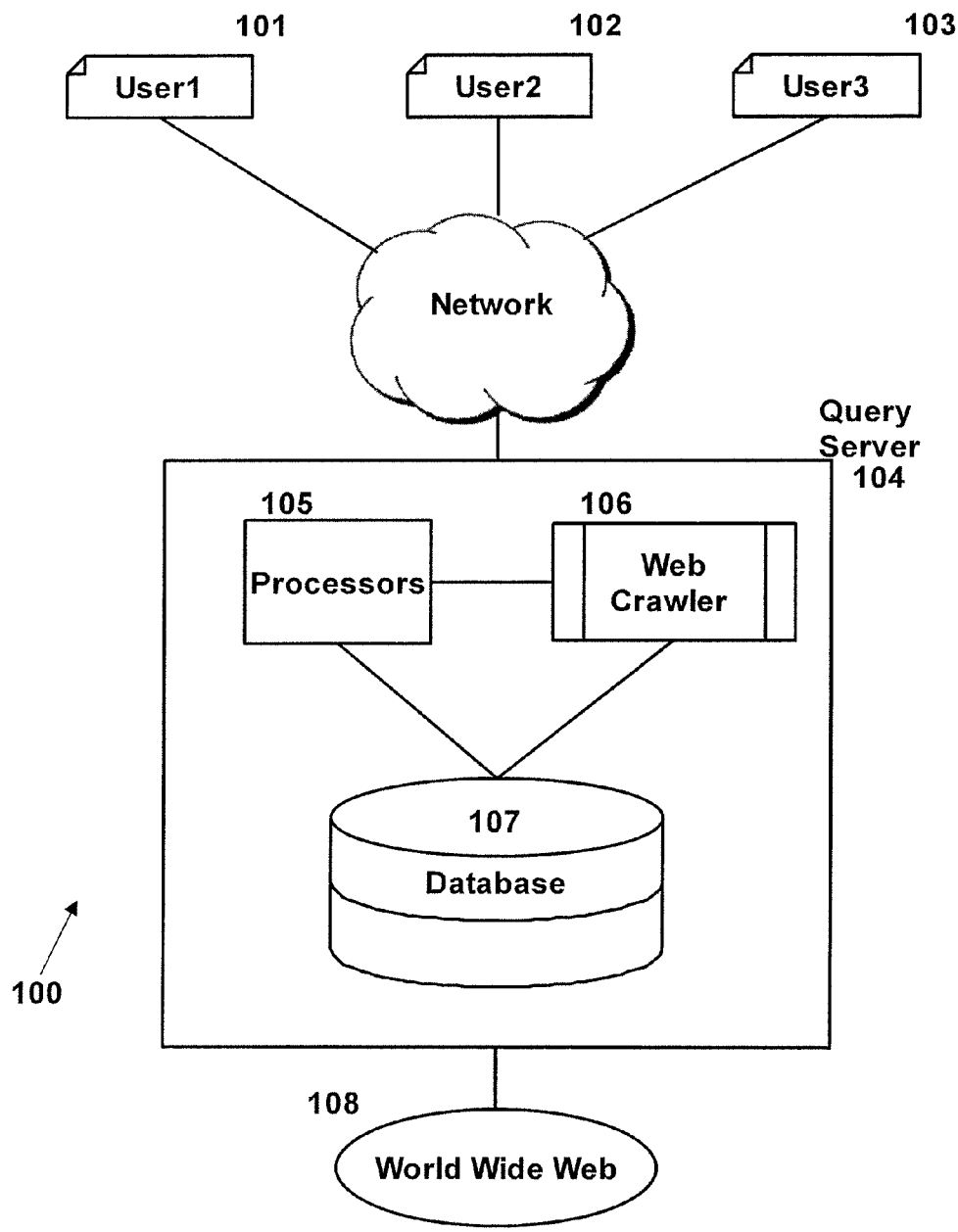
FIG. 1 provides an exemplary schematic diagram of the system for personalized data gathering.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a method for customized data gathering and presentation based on user interests and user attributes. Traditionally, searches are conducted based on keywords and/or tags. The present invention provides a multi-platform search interface which provides traditional instant search query result to activity-focused search result, both reflecting the user's interest and attributes. Multiple user interests, such as "cooking" and "fishing", may be considered at a single search session while reflecting the results based on a schema that ties multiple variables of the user's input in multiple dimensions.

The system of the present invention may define the scope of the search based on user's interest and attribute. The same keyword may be searched by multiple users, while each having different objectives and scopes of the search in mind. The present method of gathering data utilizes the user interests and user attributes to define the objective and scope of the search. For instance, the user interest in "reading" may be personal or professional, for a personal purpose the system may consider user attributes, such as age and education. For a professional purpose, the system may consider user attributes, such as occupation and annual income. Such linkage between user interests and user attributes may be defined by the schema.

The present system may provide user interfaces in a user's computing device where the user may create multiple profiles including the user interests and user attributes, the multiple profiles may be reflected, collectively or severally, to determine the search objective. List of action verbs are generated based on the user profile by a database schema and from the internet. The database schema stores and builds multi-dimensional relations among the user interest, user attributes, and the action verbs.

Initially, the search result may be found by a search module or a web crawler, then the system may process the search result to parse and present them into appropriate details based on the user interest, user attributes, goals, activities, and the like. Ultimately, the system may provide the same search results differently based on the user profile of each user requesting a search. Each activity from the search result may be ranked in order of ranks Users may personalize sorting and ranking of the search result by assigning priority to their user interests and user attributes.

The search result may be presented in an activity graph, such as a calendar or a timeline, providing the user with activities from the search result. Such presentation of search result allows the users to manage their schedule of activities on a periodic time basis. The system may inform the user with upcoming activities/available activities based on the user profile. The user may be able to set a goal that encompasses multiple activities and track progress of the activities on the activity graph. The user also may set up alert to be informed with the status of their activities and goals.

The present system may provide a social aspect where multiple users share timelines, activities, and the like. The social element enables collaboration and adds another dimension to the search result ranking. For example, collaboration may be recommended to a user who is interested in music with another user who is interested in concert ticket sales. Such relations between users enable the system to reflect such relations when ranking the search result. When the users collaborate, the database schema stores information of relations and related activities, goals, and action verbs. Each search session would create relations among the action verbs and added to the database schema. Thereby, creating a list of action verbs indexed with multi-dimensional factors.

Commonly, web crawling is an automated and methodical process of gathering information from the Internet. This gathered data is then used by the initiating web crawler or search engine to create an index that can then be searched by a user through a web-based interface.

In the present disclosure, a system for personalized data gathering from the Internet is provided. The system may comprise one or more processors, one or more databases, a web crawler, and one or more programs. The one or more programs may comprise instruction that, when executed, presents a user a search platform that gathers information based on the user profile by employing the methods described herein. Additionally, the above mentioned system may further comprise a network where multiple users may have access thereto using a computing device. The system may be connected to the internet.

The system may comprise one or more computers or computerized elements in communication working together to carry out the different functions of the system. The invention contemplated herein further may comprise non-transitory computer readable media configured to instruct a computer or computers to carry out the steps and functions of the system and method, as described herein.

The computing devices and user devices contemplated herein, may include, but are not limited to, desktop computers, laptop computers, tablet computers, handheld computers, smart phones and other cellular phones, and similar internet enabled mobile devices, digital cameras, a customized computing device configured to specifically carry out the methods contemplated in this disclosure, and the like.

The information and data contemplated herein, may include, but is not limited to text data, image data, audio date, video data, and the like.

A method for personalized data gathering in accordance with the system described above is provided. The system may define a scope of the search based on a user interest. A user may set the user interest which may define the scope of the search being conducted by the system. The user interest may be stored in the one or more databases. In one embodiment, the computing device may provide the user a computerized user interface where a user may have access to define the user interest and user attribute.

The user interest may be of any topics that the user is interested in or any information that the user selects to gather from a search session. The user interest may be a personal interest. By way of example, the user interest may be a hobby such as "pets" or "dogs". The user interest also may be a professional interest relating to the user's occupation or research. The user interest may have any form of words.

The result may be presented in various ways. In one embodiment, the system may update the result by gathering information periodically. By way of example, the system may gather information of the interest area on a daily, weekly, or hourly, basis. The result may be updated accordingly and presented to the user.

In another embodiment, the system may present only new information to the user. The system may gather information regularly and present to the user only up-to-date information.

In yet another embodiment, the system may present only relevant portion of the gathered information to the user. By way of example, the user may be presented with only the location, time, and the RSVP information of event information.

In a further embodiment, the system may present the user a URL or a raw version of the gathered information without processing them.

Users may provide the user interests and the user attributes through a computerized user interface on a user device. In one embodiment, the user may define the user interest in a user interface called "cards". The program within the system may provide the user a card as a user interface for the user to define the user interest. Once a user builds the card, it may be linked to another user's card through an aggregation module. The aggregation module aggregates the user interest from both of the cards stored in the system. Multiple users are connected in a network which contains the system. In turn, the information is gathered based on the aggregated user interest.

The card may define not only the user interest of the user, but also may include attributes of the user. The user attribute defines the status of the user. By way of example, the card may include user attributes such as occupation, age, sex, marital status, and the like. The information may be gathered and customized based on the user attributes. In one embodiment, the customization may be the basis to rank the gathered information and presented to the user in order of ranks.

The user may update, manage, create, or change information entered in the card at any time. Such actions made to the card may be identified by the system and the information may be gathered reflecting such actions.

In one embodiment, the user may publish information in the system or the network, thereby introducing new information to one or more users. The published information may be exclusively added to a database separately from the World Wide Web, where only the users within the network may have access to such published information. The system may additionally gather information from the user published information, shared to a user community.

The system for personalized data gathering may implement a social media aspect. In one embodiment, each of the multiple users may publish a log of the activities that the user has conducted. The log may be searchable such that it may be utilized for linking one user to another user, based on the activities being shared or the activities being generated from common user interests or user attributes between the two users.

The following further describes exemplary embodiments of the operational environment and methods for personalized activity data gathering.

A system for personalized activity data gathering is provided. The system presented herein represents a high-level architecture of system components and functions to carry methods presented herein. The system and method disclosed herein may be operable with one or more computing devices. The system may comprise a processor in communication with series of modules within a query server. The series of modules may comprise an aggregation module, an action verb generator, a search module, a sorting module, a ranking module, and a suggestion module. The processor may be in communication with the internet and a database schema. Further, a user may provide user interest and user attribute through a user interest GUI and a user Attribute GUI, respectively, to the query server via a network. A user interface called an activity graph module provides the user with a search result carried by the query server.

The aggregation module may be established with a bi-directional communication channels between the system and the users, where any type of user inputs and system outputs may be collected. The aggregation module may further determine a scope of the search based on the user input and the system outputs. The action verb generator may generate actionable verbs from any words. The action verb also may generate words of any type related to the user input. The search module may process the action verb and gather a base content including activities that conforms to the user input and the scope of the search. The sorting module may examine the base content and identify portion of the base content that matches the user input to provide a plurality of target contents. The ranking module may rank the plurality of target contents. Each of the plurality of target contents may be presented to the user in order of the ranks decided by the ranking module. The ranking module decides the ranks of each of the plurality of target contents by considering rank factors. Finally, a suggestion module may be provided within the system which may suggest foreseeable activities, related activities, goals, guides and alternative search strategies conforming to the scope of the search.

A method of gathering activity data based on user interest and user attribute is provided. The method may be employed by the system disclosed herein.

The method begins with collecting user input. The user input includes a user profile which comprises the user interest and the user attribute. Multiple user interests may be collected by the aggregation module. As such, user interest is a variable that defines the scope of a search. The user interest may be any information, which may include, but are not limited to, personal interest, professional interest, topics, people, and products. The user attributes may be attributes that identify the user. Such attributes may include, but are not limited to, age, health, financial status, sex, marital status, occupation, race, educational background, and the like. The user attributes may be changed. Multiple user attributes may be assigned to the user. Each of the multiple user attributes may be reflected in the method of gathering data either collectively or severally.

In one embodiment, the user may provide the user interest and the user attribute through the user interest GUI and the user attribute GUI where both are in communication with the query server via the network.

In another embodiment, the user may provide a single user interest and multiple user attributes relating to the single user interest. By way of example, the user may provide the single interest, "cooking", with the multiple user attributes of "Location: Boston" and "Educational background: Culinary school student". Once the user input is identified, the query server may utilize the provided single user interest and the multiple user attributes to gather personalized activity data.

In yet another embodiment, the user may provide a multiple user interests and a single user attribute.

In a further embodiment, the user may provide a multiple user interest and a multiple user attributes. The user may initiate a search session with the entire user input interrelated to each other or the user may selectively prioritize any combination of the multiple user interests and the multiple user attributes for each search sessions.

In a further embodiment, one user's user interest and user attribute may be combined with another user's user interest and user attribute, thereby aggregating multiple user interest from multiple users. In this embodiment, the one user and another user may be collaboratively search for an activity that is personalized for the two of them.

Once the user interest and the user attribute are collected by the aggregation module, the action verb generator may generate an action verb based on the user interest and/or the user attribute. The action verb generator may determine a scope of the search. Further, the action verb generator may generate a plurality of action verbs based on the user interest.

In one embodiment, the action verb may be obtained from the database schema. The database schema may include a list of action verbs that relates to user interests and user attributes. The database schema may obtain an action verb that is inputted by the user, when the user provides a user interest in a verb form to initiate the search.

In another embodiment, the action verb may be generated from the internet. The database schema may be in further communication with the internet. The search module in communication with the action verb generator may collect the action verb that is related to the user interest.

In yet another embodiment, the action verb may be generated solely based on either the user interest or solely based on the user attribute. Similarly, the action verb may be generated based on both the user interest and the user attribute. Further, the action verb may be generated based on a selection from the plurality of user interests and the plurality of user attributes.

The action verb generator may build a hierarchical link between each of the plurality of action verbs and the user interest/user attribute. As such, the action verb, once generated, may be stored to the database schema with the hierarchical link built to the action verb. By way of example, the action verb generator may generate words such as, "fishing", "swimming", and "yachting", based on the user interest "water sports". The hierarchical link may be defined among the three words, for example, "swimming" may take higher hierarchy over the word "fishing", while "yachting" takes lower hierarchy compared to the word "fishing".

In one embodiment, the hierarchical link built to the action verb with the user interest may be pre-established in the database schema. The database schema contains logic that defines the hierarchical link among the action verbs stored therein.

In another embodiment, the hierarchical link built to the action verb with the user interest may be assigned by the user.

In yet another embodiment, the hierarchical link built to the action verb with the user interest may be learned by the query server from observing the user's search history and web activity.

The database schema may further define relations among multiple users and their corresponding user interests and user attributes. In one embodiment, the relations between multiple users may be established by one of the multiple users initiating a search session. The relations between multiple users may include, but are not limited to, friend, mentor, coworker, or stranger. The one of the multiple users may assign such relations among the multiple users. The relations built among the multiple users may be stored in the database schema, and further be assigned with a value. The value may represent degree of priority of the relations built among the multiple users.

In another embodiment, the relations among the multiple users may be identified by the system from the user's web activity and search history. The web activity or search history may include any relations among the multiple users in a social websites or any other web activities that indicates relations among the multiple users.

Once the action verb is generated, the search module may gather a base content based on the action verb generated by the action verb generator. The base content may comprise of activity data of any type such as, events, concerts, tasks, recipes, and the like. The search module may be in communication with a database storing the base content.

In one embodiment, the base content may be gathered from the internet.

In another embodiment, the base content may be gathered from the database schema. The database schema may be in connection with a user community. The user community may comprise users utilizing the present system and method. The user community may provide information, such as, activities being searched by the users employing the query server, activities being hosted by the users, and activities being planned by the users. Such activities from the user community may be the basis for the base content. In addition, the user community may provide any information published or shared by the users within the user community.

In yet another embodiment, when multiple users are aggregated in a single search session, the base content may be searched based on the plurality of action verbs derived from the multiple users. Similarly, as discussed above, the base content may be based on the plurality of action verbs generated from a single user.

The search module may not gather any base content including a certain action verb. In such case, the action verb generator may provide the user with an alternative action verb that is derived based on the user attributes. In one embodiment, the alternative action verb may be suggested from the user attribute. By way of example, if the search module fails to gather any data related to action verbs: "Barbeque" and "vegetarian cooking" the action verb may initiate a search scope relating to the user's attributes. The suggestion module identifies that one user attribute is "Hobby: fishing", then the action verb generator may provide alternative action verbs "Barbeque" and "Pescetarian cooking".

In another embodiment, similar to the action verbs being generated from the database schema, the database schema may contain a list of alternative action verbs linked to one of the plurality of user attributes. In yet another embodiment, the alternative action verb may be suggested from the user community. The users of the query server, the user community, may provide action verbs that are not included in the database schema. The action verbs and alternative action verbs may be identified by the action verb generator and stored within the database schema provided by the use community.

The base content may be further processed through the sorting module and the ranking module. In one embodiment, the sorting module may match the action verb with the base content to identify a portion of the base content that matches the action verb. The base content may include data or information unrelated to the search session. By way of example, a ticket seller's website may include multiple ticket information that is not related to the ticket the user is interested in. Such ticket seller's website is an example of the base content. The portion of the base content that matches the action verb is a target content.

In another embodiment, the sorting module may match a plurality of base contents from different sources to the action verb, identifying a plurality of target contents originating from different base contents.

In a further embodiment, the sorting module may index the plurality of target contents. The plurality of target contents may be compared to a plurality of categories, where the plurality of categories is defined by the user attributes. Each of the plurality of target contents are indexed to assign the plurality of categories, associated to the user attributes, that matches the plurality of target contents. By way of example, the indexing can be conducted by the user attribute "age: 12". Any of the plurality of target contents that contains age related information may be indexed according to any age information present in the target content. The target content may not be suitable for age of 12, then the category may be assigned as such.

In yet another embodiment, the plurality of categories may have a hierarchical structure defined in the database schema. The database schema may define priority of the categories by applying the hierarchical structure among the plurality of categories. Alternatively, the user may define the hierarchical structure.

In a further embodiment, the sorting module may filter out the plurality of target contents based on user preference. The user may prefer to receive certain type of information. The type of information may include, but are not limited to, Q&A, recipe, event, review, and the like. The type may be tagged to the target content. Similarly, the user may prefer to receive information published by a certain author. The author can be identified from the plurality of target contents, and the plurality of target contents that matches the preferred author may be selectively provided to the user.

The ranking module may further assign rank to the plurality of target contents identified by the sorting module. The ranking module ranks the target content based on rank factors. The rank factor comprises elements that define relations among users, user interests, and user attributes. The rank factors may include the hierarchical link defined among the action verbs and the hierarchical structure defined among the categories. The rank factors and an assignment of rank may be stored in the database schema. The database schema may include relations defined among users, user interest, categories, action verbs, and user attributes.

The rank factors and ranking methods described herein may be selectively combined to create multiple dimensions of ranks. Each permutation of rank factors may be utilized to accommodate varying scopes of a search, thereby providing a multi-dimensional search results. Instead of ranking, the rank factors may be utilized to select information being preferred by the user as well.

In one embodiment, ranks may be assigned based on a number of matches the target content has with the action verb. In this embodiment, the rank factor is link to the number of matches with the action verb. A target content having more number of matches to the action verb may be assigned a higher rank than a target content having less number of matches to the action verb.

In another embodiment, ranks may be assigned based on a number of matches the target content has with the plurality of action verbs. The multiple user interests and the multiple user attributes may have a hierarchical link to each of the plurality of action verbs. The hierarchy of the action verb existing in the target content may contribute to the rank factor of the target content.

In yet another embodiment, the plurality of action verbs generated from multiple users may be common to one or all of the multiple users. Ranks may be assigned higher to the action verb that is most common among the multiple users. User profiles from the multiple users may also have common user interest and user attribute. In this case, the action verb linked to the common user interest and user attribute may be assigned a higher rank. Accordingly, the target content with the action verb linked to the common user interest and user attribute may be assigned a higher rank.

In a further embodiment, ranks may be assigned based on a user attribute of the author of the target content. The author of the target content may have an occupation attribute that is closely linked to the action verb. A higher rank may be assigned to target content belonging to the author. By way of example, the action verb "Italian cooking" belonging to the target content written by an author with user attribute "Occupation: Chef" and "Location: Italy", would be assigned a higher rank.

In a further embodiment, ranks of the plurality of target contents may be assigned manually by the user.

In a further embodiment, rank factors may include user attributes such as location and time. A higher rank may be assigned to the target content linked to the location common to the user or the time suitable for the user's schedule.

In a further embodiment, the rank factors may include the rating of the target content. Often times, many instructional information are rated by the users who has performed the instructions provided by it.

In a further embodiment, ranks may be assigned based on the values assigned to the relations among multiple users. The action verb generated from the user interest and the user attribute belonging to a user with closer relations among the multiple users may be assigned a higher rank. Similarly, a target content that are common to a multiple users where the multiple users have a closer relations, may be assigned a higher rank. Also, target contents generated from a user where the user's user attribute matches closely to the action verb or topic being searched may be assigned a higher rank. For example, if the action verb is "completing tax return", the target content generated from a user with a user attribute of "degree: accounting" is assigned a higher rank.

In a further embodiment, ranks may be assigned based on the plurality of categories. A higher number of the plurality of categories indexed to a target content may result in higher rank. Also, the plurality of target contents may be indexed with a category that is common to the multiple users. A number of such categories within the target content can affect the ranks. In addition, the hierarchical structure associated to each of the plurality of categories may affect the ranks.

In a further embodiment, the rank factors may be obtained from logging and observing the user search history or the user web activity.

In a further embodiment, the rank factors may be updated in real-time as the user profile changes. A change in the user attribute "location" may be reflected to the ranks being assigned to the action verb prior to the change. Similarly, ranks may reflect a change in the user attribute "time". As the user progresses with the personalized activity data generated by the system, the user may have time constraints in duration of the activity or start time of the activity. By way of example, ranks assigned to the target content of a recipe that requires longer duration may be assigned a lower rank, if the user has conflicting personalized activity data, such as a concert scheduled in the user's timeline or activity graph.

The activity graph module may provide the user with a user interface that presents the target content in a time line, thereby presenting the user with the activity data. By way of example, the target content may be presented as a to-do-list. The activity graph module may include the activity data which is the target content, personalized by the method disclosed herein. Each of the plurality of target contents may be presented to the user in the activity graph module in order or ranks assigned by the ranking module. The user may select one or more of the plurality of target contents to be presented in the activity graph module.

In one embodiment, the user may indicate one or more of the plurality of target contents that the user intends to achieve. Such user indication may be reflected in the database schema and may be linked to the sorting module and the ranking module for assignment of ranks.

In another embodiment, the activity graph module may include a plurality of target contents generated by multiple users. The multiple users of the target content may assign each of the target contents to one or more the multiple users to be achieved. This embodiment may be employed when the plurality of target contents represents a series of personalized activities to be achieved in a step-by-step fashion.

The user interest and the user attribute may be utilized for generating targeted marking and advertisement. Similar to the methods described above, the user may be a merchant who may suggest his or her product to another user based on another user's user interests, user attributes, action verb, and ranks. Such suggestion may be prompted by the suggestion module.

The suggestion module may provide the user with alternative options. The system of the present invention may not provide the user with any target contents. The action verb of the search scope may not have any corresponding target content. Including such case, and any other cases, may require the suggestion module to provide the user with alternative options in a search session.

In one embodiment, an alternative action verb may be provided by the suggestion module. The suggestion module may identify the alternative action verb based on the user attributes, where the database schema contains a list of alternative action verbs. Similar to the action verbs, the alternative action verbs may have a hierarchical link defined among the alternative action verbs in relation to the user attributes.

In another embodiment, the suggestion module may provide a foreseeable activity based on a plurality of related action verbs. The foreseeable activity may be generated by running a search session utilizing the method disclosed herein based on the plurality of related action verbs. The related action verbs may be searched when the action verbs itself does not return any target content back. As such, the plurality of action verbs is different from the plurality of action verbs.

In a further embodiment, a user goal may be suggested by the suggestion module. The suggestion module may identify the user goal from the activity data or the plurality of target contents being provided to the user. The user goal may be the result that may be achievable by the user completing the activity data presented in the plurality of target contents. The database schema may define a series of activities that can be performed by a user to achieve a user goal. The suggestion module may suggest a user goal based on a series of action verbs being searched by the search module. The database schema may store action verbs relating to the user goal and link them together.

The suggestion module may provide the users with various types of alerts.

In one embodiment, the suggestion module may alert the user when a new activity data is introduced to the database schema, which links to the user's user interest, user attribute, or action verb.

In another embodiment, the suggestion module may alert the user when another user having a relation built to the user is hosting an activity.

In a further embodiment, the user interest may be in the form of a user goal. A series of action verbs may be generated by the action verb generator to achieve the user goal, and suggested by the suggestion module to the user. Once the user indicates that the user interest is the user goal, ranks being assigned to the target content of the series of action verbs may be higher. As described above, the target content including the series of action verbs may be presented in the activity graph module. The user may track the progress of the user goal with the activity graph module.

The suggestion module may provide the user with a guide. The guide is a user within the user community that may be well versed with the action verb or any topic being searched by another user. In one embodiment, the guide may be suggested to the user based on the user interest. The guide having a user attribute that is closely related to the user interest being searched may be identified by the suggestion module. For example, if the user searches are related to "building a birdhouse", a guide with an attribute "hobby: birdhouse design may be identified and suggested to the user. The user, then, may contact the guide within the user community for personal help. In another embodiment, the user may selectively initiate a search session to identify the guide.

In yet another embodiment, the guide may be an author providing information to the user community. The user may initiate a search session to identify information published by the author or the guide.

Turning now to FIG. 1, an exemplary schematic diagram of the system for personalized data gathering is shown. The system 100 may comprise multiple users 101 102 103 where each of the multiple users are connected to the network. The query server 104 may comprise a processor 105, a web crawler 106, and a database 107. The query server 104 is in communication with the network. The query server may further communicate with the World Wide Web 108. In this exemplary embodiment, one or more users input, such as interests and attributes are aggregated and searched for in the internet.

Figure 2:
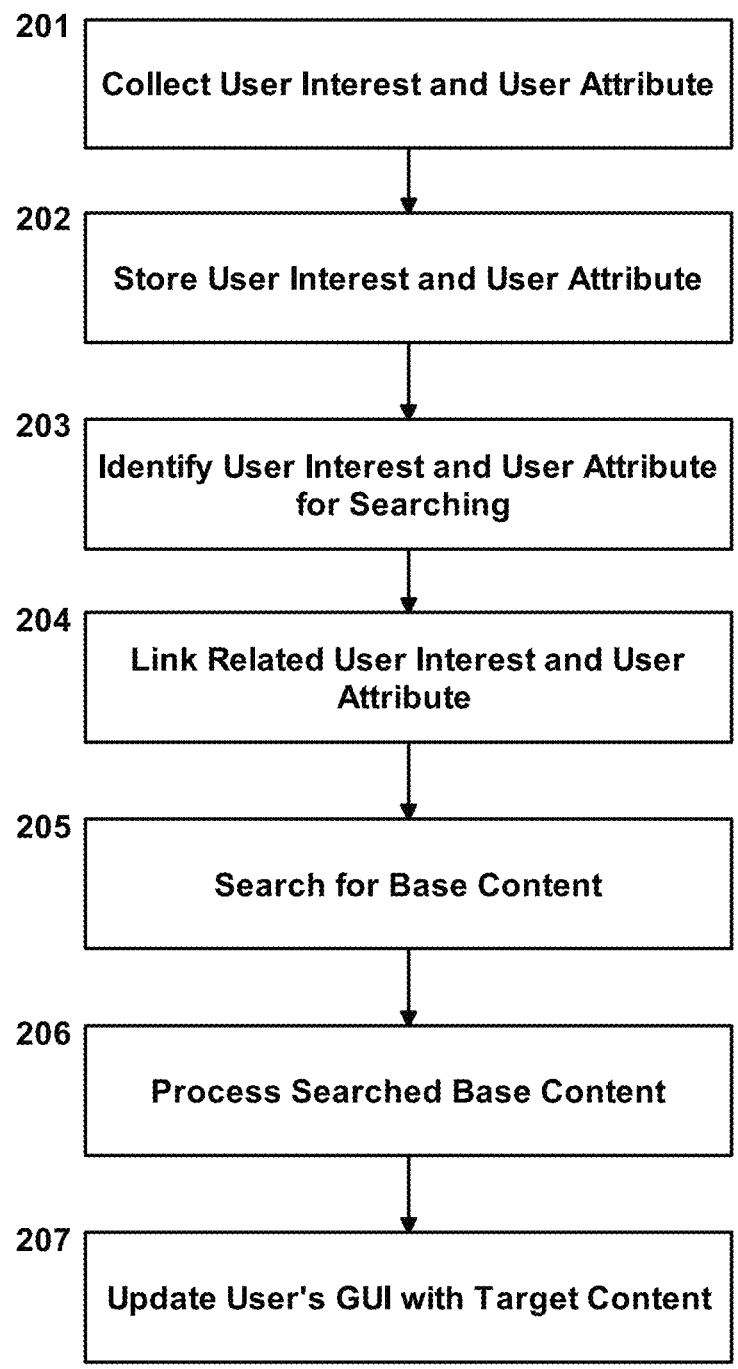
FIG. 2 provides an exemplary embodiment of the method for gathering information.

FIG. 2 shows an embodiment of the method for gathering target content. At step 201, the user interest and the user attribute are collected by the system. The system stores the user interest and the user attribute to the database schema 202. The user interest and the user attribute may be recorded in the form of the card as discussed above. For the search or gathering of personalized activity data to begin, the system identifies the user interest and the user attribute at step 203. The action verb generator may link related user interest and user attributes to build hierarchical link among the user interests and the user attributes 204. The search module then searches for the base content based on the user interest and the user attribute 205. The search result may be further processed 206 through the ranking module and the sorting module. At 207, the system may update user interfaces (the activity graph module) with the search result that is personalized.

Figure 3:
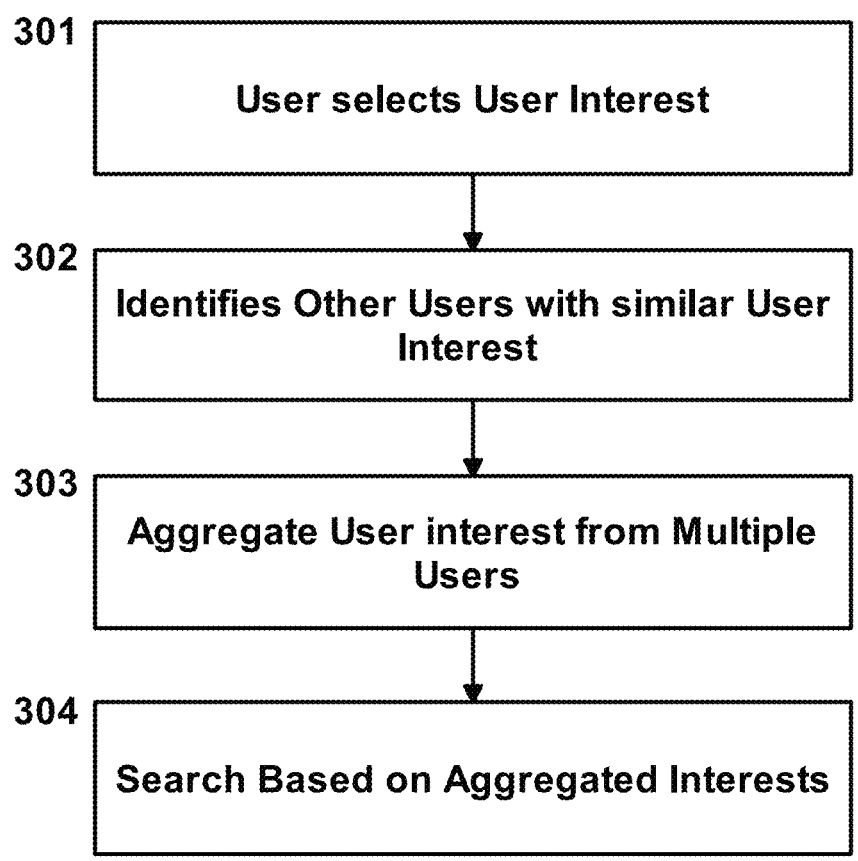
FIG. 3 provides exemplary steps involved in gathering information based on more than one user's user interest.

FIG. 3 illustrates steps involved in gathering information based on more than one user's user interest. A user selects the user interest at 301. The system further identifies another user's user interest and links them to the user. At 302, another user's similar user interest is identified and linked to the user's user interest and aggregated at step 303. Activity data is then gathered based on the aggregated user interest from multiple users 304. Thereby, providing the activity data conforming to the search objectives of both the users.

Figure 4:
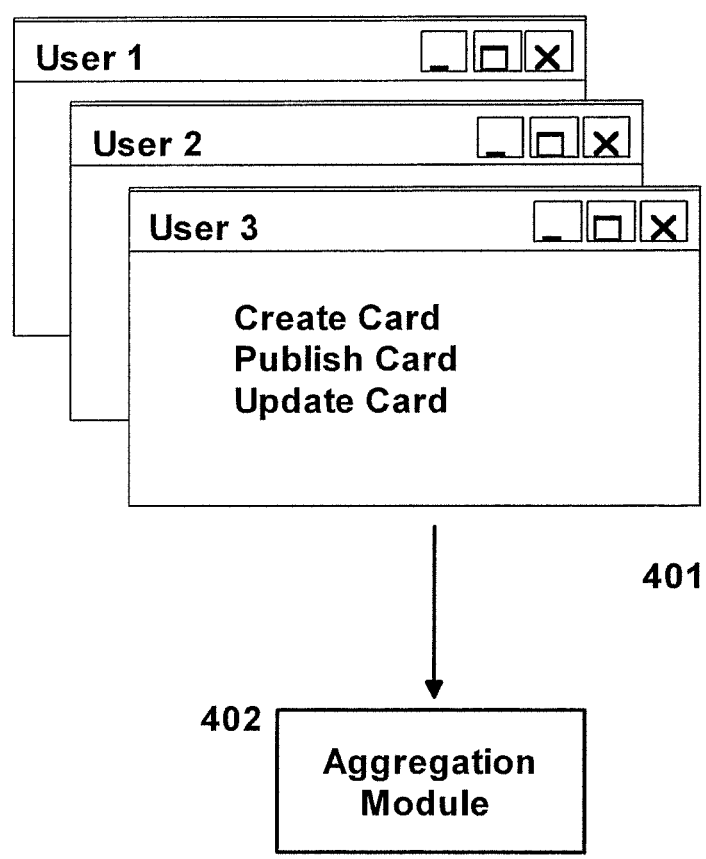
FIG. 4 provides an exemplary schematic of aggregating multiple user cards.

FIG. 4 shows an exemplary schematic of aggregating multiple user cards. The cards 401 may be created by each user. Each user may also update the information of the card, particularly the user interest may be updated. The card may be utilized to publish information from the user. Multiple users' cards 401 may be aggregated once requested by the user or automatically by the system based on the similarities among the user profiles. Once the cards are linked together by the aggregation module 402, information may be gathered based on the aggregation module. The aggregation module aggregates the user interests from the cards 401 stored in the system.

Figure 5:
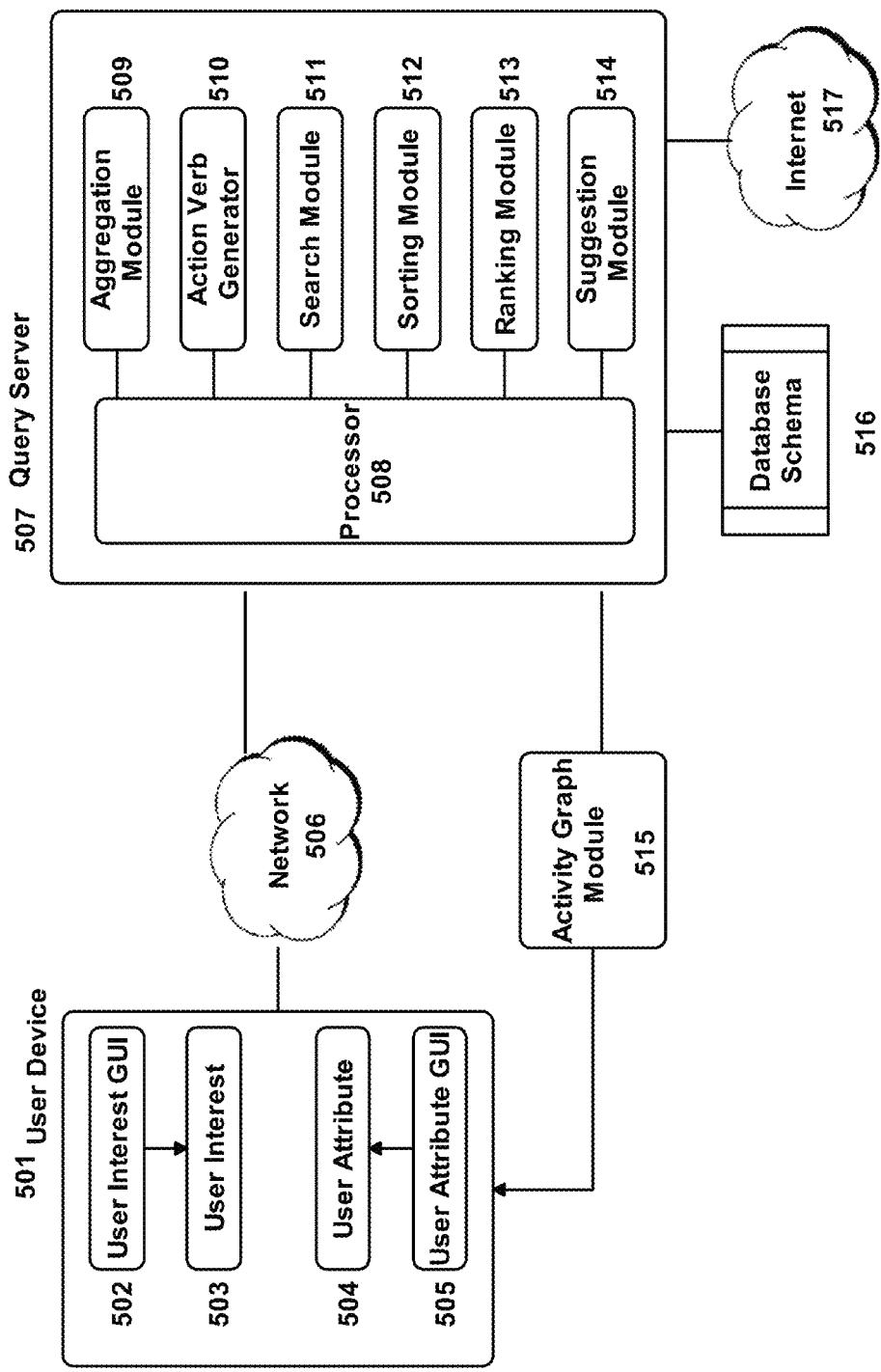
FIG. 5 provides a detailed exemplary schematic diagram of the system for personalized activity data gathering.

FIG. 5 provides a detailed exemplary schematic diagram of the system components and its design for personalized activity data gathering. The user device 501 provides the user interest GUI 502 for the user to input the user interest 503. The user device 501 also provides the user attribute GUI 505 for the user to input the user attribute 504. The user device 501 is in communication with the query server 507 via a network 506. The query server 507 comprises a processor 508 linked to a multiple modules for generating a personalized activity data. The multiple modules comprise the aggregation module 509, the action verb generator 510, the search module 511, the sorting module 512, the ranking module 513, and the suggestion module 514. The query server is in further communication with the database schema 516 and the internet 517. The activity graph module 515 provides the user with the activity data personalized by the process performed by the query server.

Figure 6:
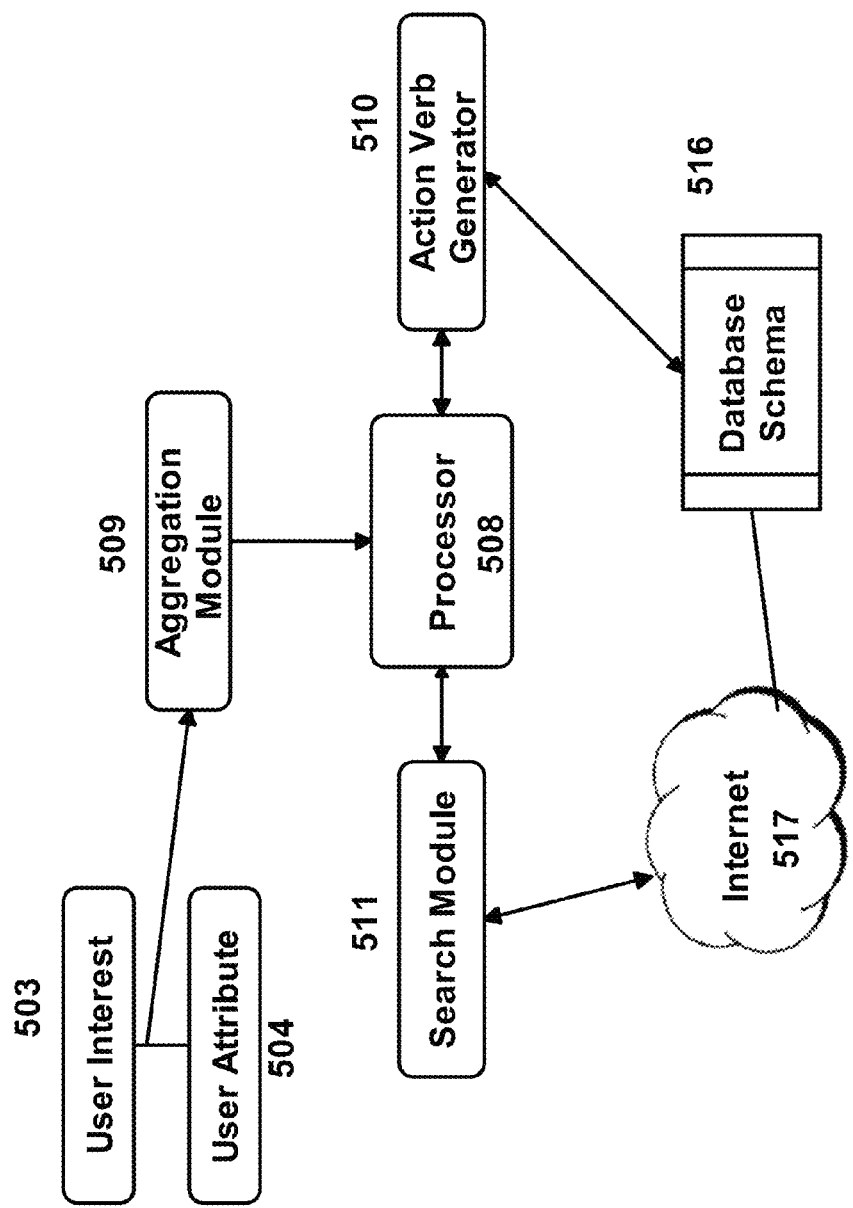
FIG. 6 provides an exemplary block diagram representing a process of action verb generation.

FIG. 6 provides an exemplary block diagram representing a process of action verb generation. The action verb generator 510 receives the user interest 503 and the user attribute 504 collected by the aggregation module 509. The action verb generator 510 generates action verbs relating to the user interest and the user attribute from the internet 517 and the database schema 516. The action verb generated by the action verb generator 510 is searched by the search module 511 where the search module 511 gathers the base content from the internet 517 and the database schema 516.

Figure 7:
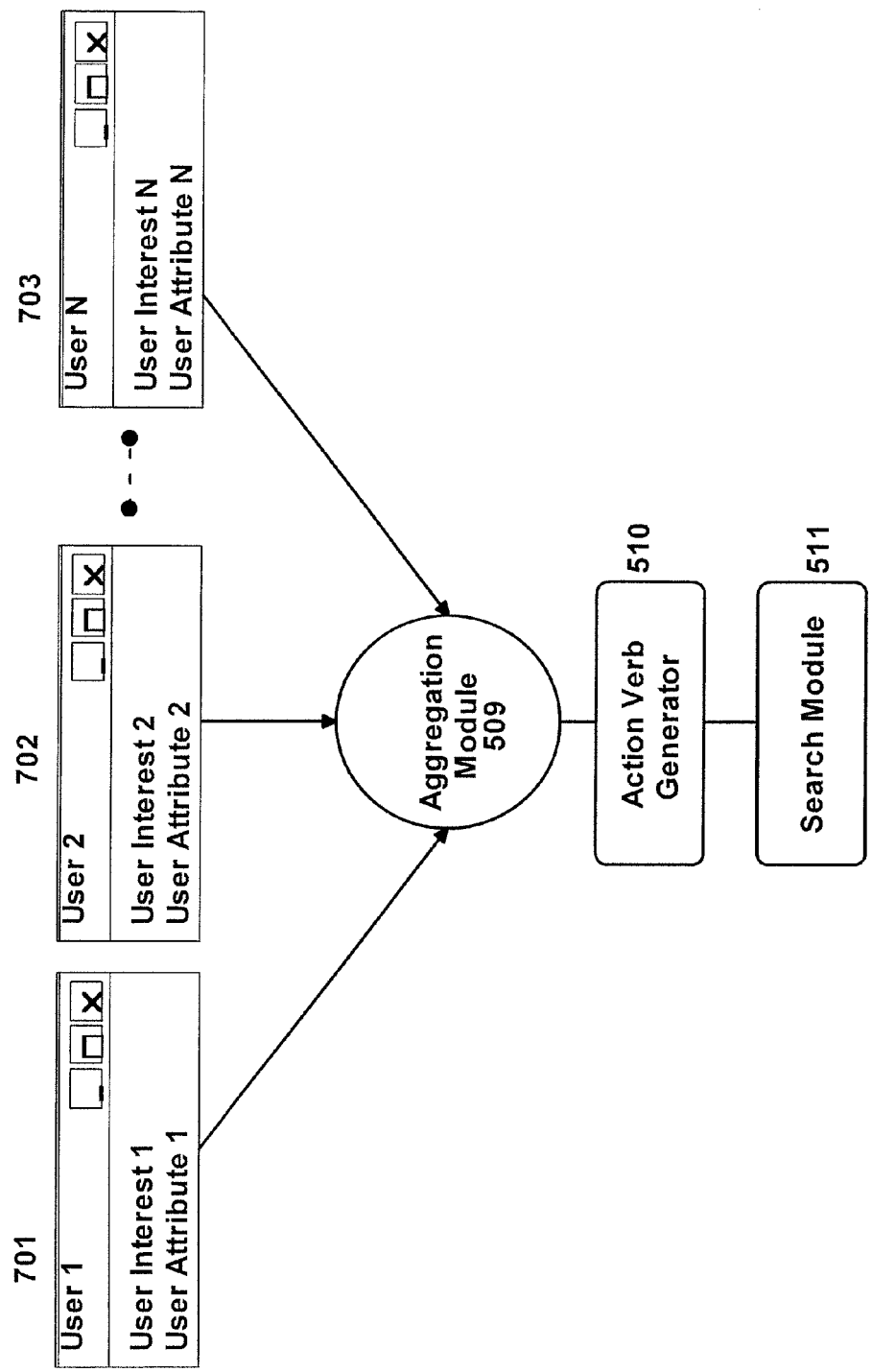
FIG. 7 provides an exemplary block diagram representing a process of multi user profile aggregation.

FIG. 7 provides an exemplary block diagram representing a process of multi-user profile aggregation. The multiple users 701 703 704 each are provided with multiple user interests and multiple attributes. The aggregation module 509 collects the multiple user interests and multiple attributes from the multiple users. Once collected, the action verb generator 510 generates one or more action verbs based on the input provided by the multiple users. The generated one or more action verbs are searched by the search module 511 to begin a search session for the multiple users.

Figure 8:
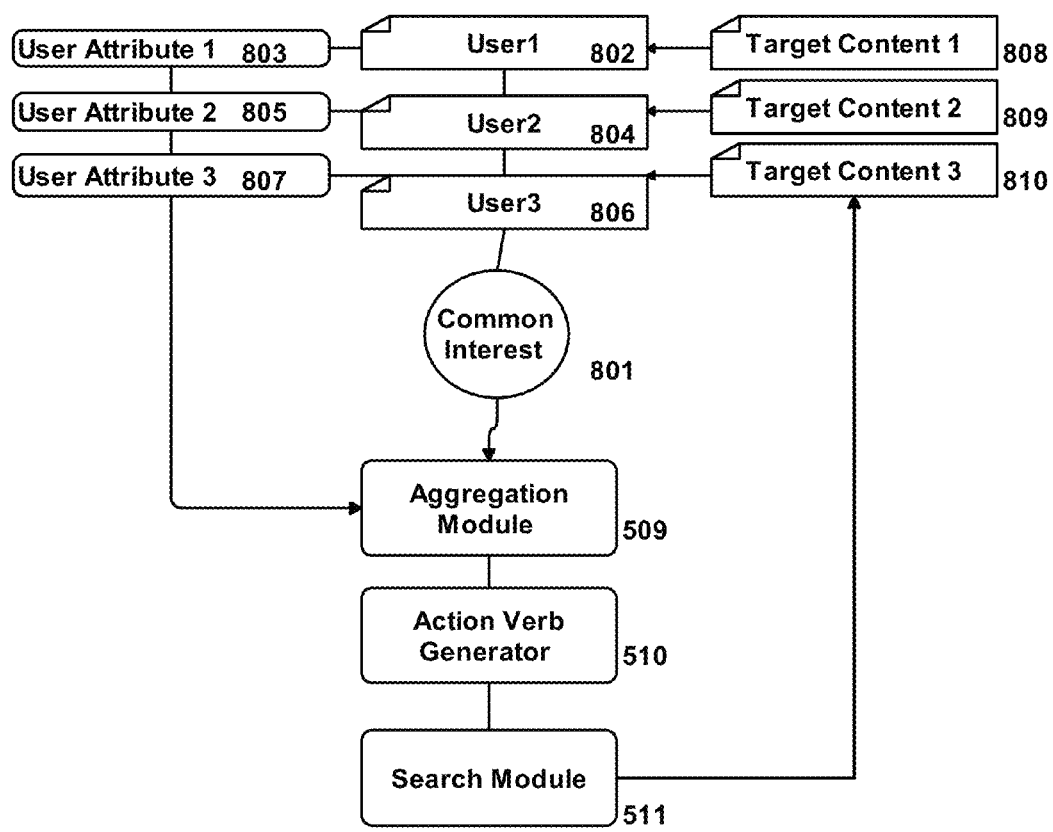
FIG. 8 provides an exemplary block diagram representing a process of multi user profile aggregation with a common interest.

FIG. 8 provides an exemplary block diagram representing a process of multi user profile aggregation with a common interest. This exemplary embodiment shows a search session where multiple users share a common interest, while each of them has varying user attributes. The multiple users 802 804 806 may have a common interest 801. On the other hand, the multiple users may have varying user attributes 803 805 807. The aggregation module 509 identifies the common interest and the varying user attributes 803 805 807. Once identified, the action verb generator 510 generates action verbs based on the common interest. The base contents may be the same for each of the multiple users, while the base contents are tailored to deliver varying target contents to each of the multiple users, based on the varying user attributes. The search module 511 initiates the search for each of the multiple users and present the target contents 808 809 810 (sorting module and ranking module not shown). The target content for each of the multiple users may vary but share the same base content. As discussed above, target contents belonging to the same base content may vary from each other because of the varying attributes affecting the rank factors. Also, indexing the target contents to categories defined by user attributes decide which target content is being presented to each user.

Figure 9:
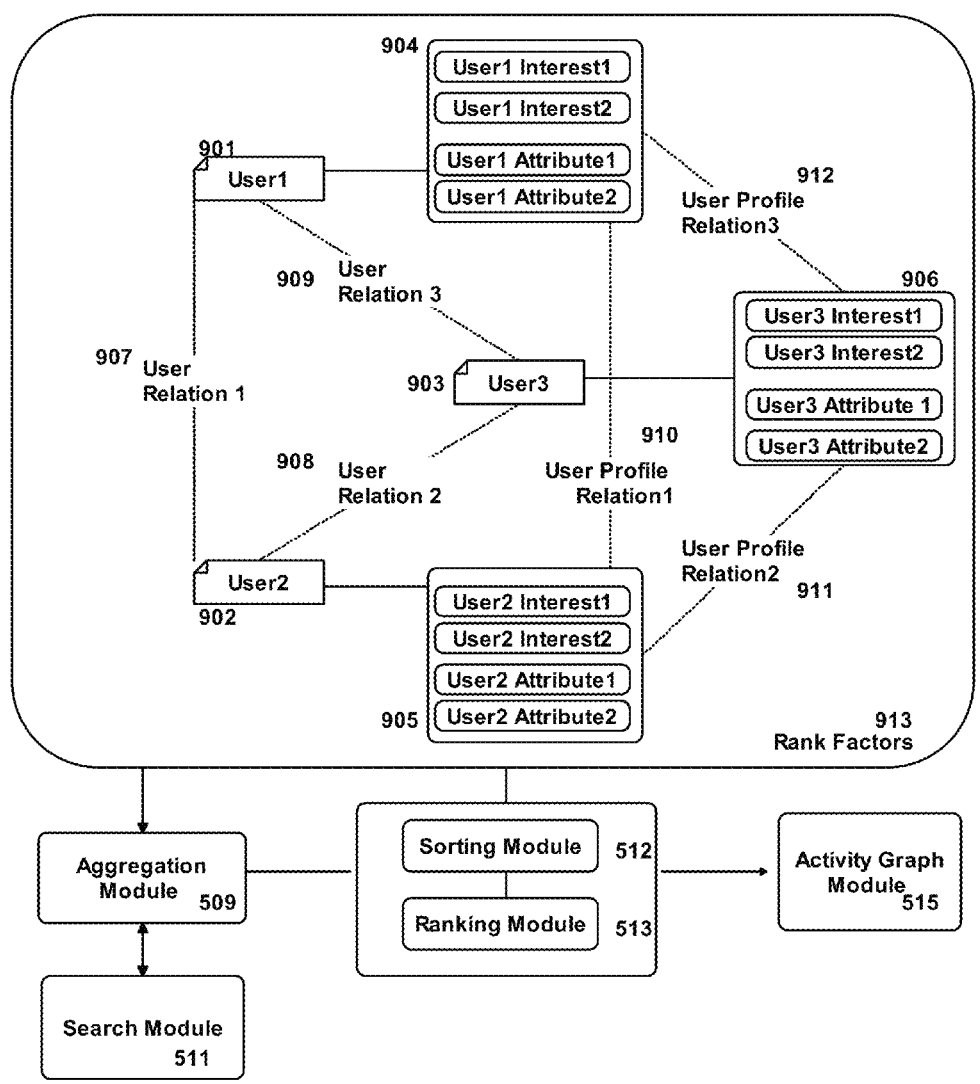
FIG. 9 provides an exemplary block diagram representing a process of rank assignment.

FIG. 9 provides an exemplary block diagram of rank assignment based on rank factors. In this exemplary embodiment, three users 901 902 903 each has two user interest and two user attributes 904 905 906 begins a search session to find an activity data suitable for the three users. The aggregation module 509 gathers the user interests and user attributes and searches for the plurality of base contents via the search module 511. A plurality of action verbs are generated by the action verb generator (not shown), which sets the scope of the search. The plurality of base contents searched by the search module 511 may be sorted and ranked by the sorting module 512 and the ranking module 513. In this example, the sorting module may match the user interests-generated action verbs with the plurality of base contents to identify a plurality of target contents. The ranking module ranks the plurality of target contents based on the rank factors. The rank factors of this example comprise a user relation 1 907, user relation 2 908, user relation 3 909, user profile relation 1 910, user profile relation 2 911, and user profile relation 3 912. The user relations define relationships among each of the three users. The closer or more relevant the relationship is the higher the rank is. Similarly, the similarity and the relevancy among each of the three user profile relations determines the strength of the rank factors user profile relation 1, user profile relation 2, and user profile relation 3. The similarity and the relevancy among each of the three user profile relations reflect multiple ranking permutations described above. In one aspect, the user profile relations may identify a common user interest being shared by the three users. The common user interest may be ranked higher and a target content with the most number of common user interest-based action verbs may be presented to the three users. In another aspect, a common user attribute-based category assigned to each of the plurality of target contents is prioritized. Once the ranks are assigned to each of the plurality of target contents, the activity graph module 515 presents the target contents in order based on the ranks assigned by the ranking module 513.

Figure 10:
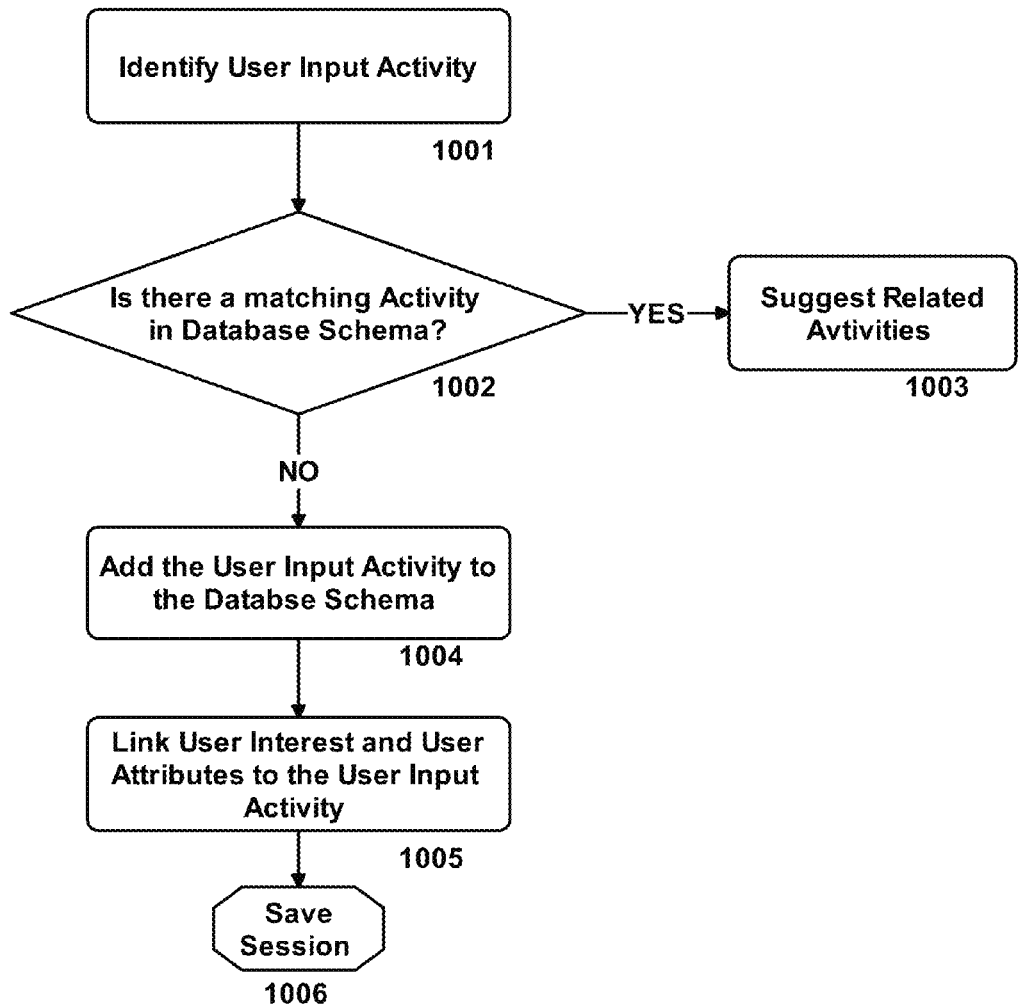
FIG. 10 provides an exemplary flow diagram representing a bi-directional relationship between activities and database schema.

FIG. 10 provides an exemplary flow diagram representing a bi-directional relationship between activities and database schema. The bi-directional relationship is established when activities inputted by the user as the user interest are stored within the database schema. In this example, a user input activity is identified by the system 1001. Once the user inputs the user input activity through the user device, the user input activity is searched within the database schema for a match 1002. When there is a match, the suggestion module suggests activities related to the user input activity at 1003. When there is no match in the database schema, this indicates that the user input activity is new to the system. Subsequently, the user input activity is added to the database schema. The database schema has built a new relation among the user input activity and the user's user profile by linking user interest and user attributes to the user input activity from the user 1005. The search session is saved to the database schema 1006 for future use.

Figure 11:
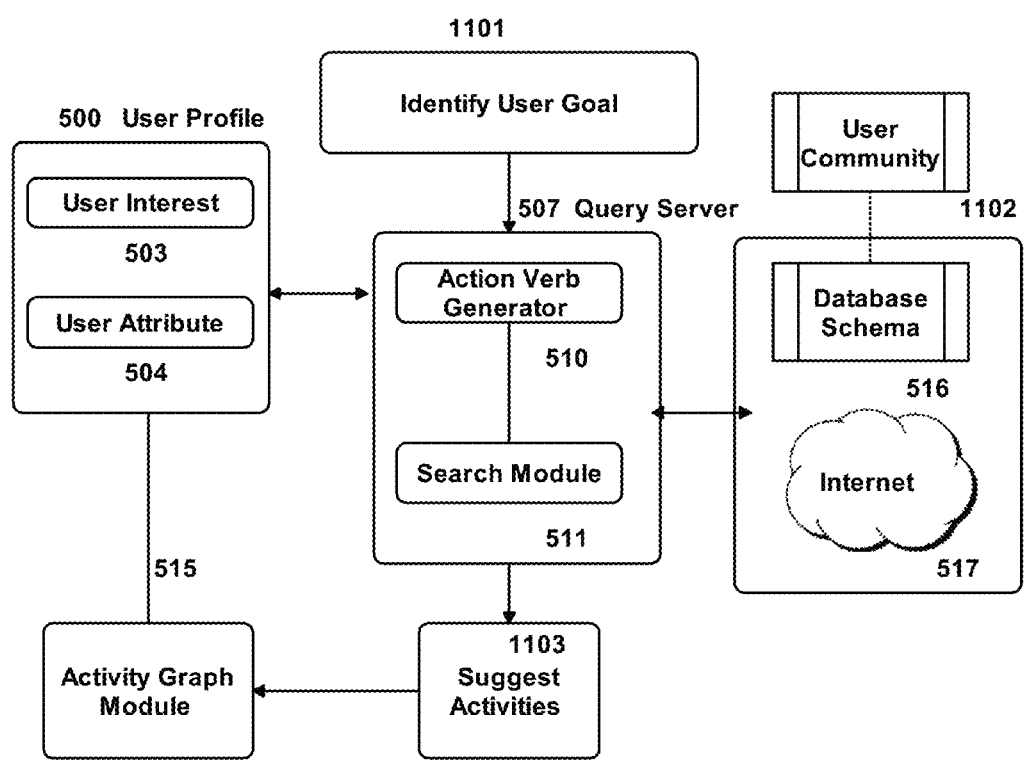
FIG. 11 provides an exemplary block diagram representing activity suggestion based on a user goal.
Figure 12:
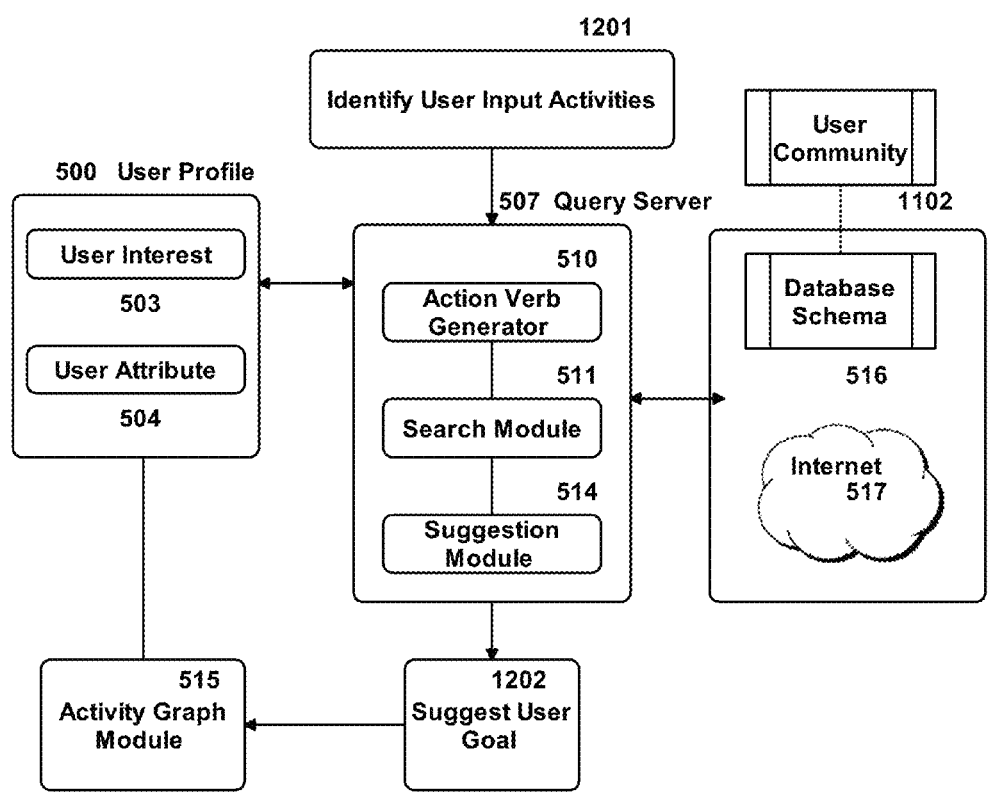
FIG. 12 provides an exemplary block diagram representing user goal suggestion based on activities.

FIG. 11 provides an exemplary block diagram representing user goal to activity suggestion. And FIG. 12 provides an exemplary block diagram representing user goal suggestion from activities. In FIG. 11, the user goal is inputted by the user as the user interest. Once the user indicates the user interest as the user goal, the system identifies the user goal 1101. Similar to a search sequence described above, the query server 507 processes the user goal through the action verb generator 510 and the search module 511 to suggest activities 1103 conforming to the user goal. The activities being suggested may be obtained from the internet 517, the database schema 516, or the user community 1102. The user profile 500 is considered to suggest a series of activities most relevant to the user interest 503 and the user attribute 504 of the user. The action graph module 515 present the user with the series of suggested activities 1103.

Similarly, the user goal input may be replaced with the user input activities 1201 of FIG. 12. In this example, instead of searching for activities to suggest, the suggestion module identifies a user goal to suggest to the user 1202. Once the action verb is generated from the user input activities 1201, the action verb is consulted with the user community, database schema, and the internet to suggest the user goal most relevant to the user interest and the user attribute. The user goal being suggested is presented via the activity graph module 515.

The database 107 in FIG. 1 includes separate databases for skills, topics, interests, people, locations, products and services (termed attributes and attribute values) with specifically designed to save the respective data types with large numbers of records. For example, products database saves every single possible product with the available prices from various stores and different sizes and shapes that are available with ID numbers and SKU numbers. The enterprise collects data from the users for the database 107. Alternatively a web-crawler application may be used to explore websites and add data to the database 107.

Similarly, a separate database is maintained for locations. The location database includes data relating to locations with all possible names, details and neighborhood ranges. The location data is collected from the user and publically available sources. Similarly, each of these attributes in the databases has their own structured data (a properly organized record that can identify any minor item with a human readable query like a "Cheapest Product," "Fastest Service" or "Nearest Location" or "famous person."

The people database includes the life achievements, popularity, type of popularity, etc. that helps internally rank these attributes. The internal rank is termed an attribute rank. The attribute rank is different from the activity rank because the attribute rank orders only with in these attributes. There are seven attribute ranks i.e. location rank, products rank, services rank, people rank, interest rank, topic rank and focus areas rank.

The system 100 considers each minimum viable web page as a guidance that might fall under four major guidance types. The guidance types include (1) readable types such as a story, lessons learnt, ideas, reviews, and Recommendations; (2) actionable types like a DIY Guide, a How-To Guide, and Step-By-Step Guides; (3) discussable types like conversations; or (4) knowledgeable types like question & answers.

The system 100 provides heavy personalization functionality where user can engage and interact with the page or guidance as a plan through follow up later. The user may also determine whether the guidance is useful for the given purpose. The user may also bookmark the guidance and make it a favorite for their network of associated users such as users that friends of the user. The system 100 also allows a user to recommend the guidance to their other social connections including their network.

Guidances are ranked for listing by a user. The guidance rank for the system 100 is multi-dimensional. The guidance rank consists of (1) the type of Guidance and how the page is helping a user; (2) is the web page (guidance) readable, actionable, discussable or a question and answer; and (3) how far the user is engaged with this page. The criteria for how far the user is engaged is evaluated based on how many users have planned to use the guidance, whether the guidance has been bookmarked or designated a favorite, whether a user has marked the page as useful, whether the user has recommended the guidance to social connection and how long it takes to read the action or discuss the questions and answers and how much the cost of the guidance is if the action consists of buying. In this manner, the guidance is personalized and ranked by personal preference.

In the example system 100, guidances may be categorized into four types: (1) a readable guidance type; (2) an actionable guidance type; (3) a discussable guidance type; and (4) a question and answer guidance type. For example, sharing about lessons learnt in photography is a "story" or a readable guidance. Explaining "how to take a professional photograph" by a DIY guide is an actionable guidance. Discussing "photography" on a topic with in "photography" is conversational guidance and asking a question or answering a question about photography is knowledgeable guidance.

In the example system 100, there are five personalization ranks that include: (1) most guidances planned; (2) most guidances designated as favorites; (3) fastest available guidances; (4) professionally available guidances; and (5) cheapest/expensive guidances available. Finally, the system 100 assists users to configure their interests into different categories that may include (1) personal interests (skill level: personal) (2) professional interests (skill level: high) (3) hobbies (skill level: medium) (4) exploring interests (skill level: basic) (5) educational interests (skill level: educational) (6) mentoring interests (skill level: Mentor). The guidance rank of any web page includes four parts. The first part is the guidance type that may be a readable guidance, an actionable guidance, a discussable guidance or a question and answer guidance as explained above. The second part is the personalization or usability rank. The usability rank is based on how many users designate the webpage as something planned, something they did or used or designated as a favorite. The third part is the social rank and timeline. This part is whether the guidance is rated or recommended to social connections and how guidance is performing over the time. Finally, the fourth part is the creator's skill rank in terms of professional, personal, hobby or explorer. The fourth part thus includes information on who created the guidance. This may include an interested person, a professional, a hobbyist, an explorer, a teacher or a student.

As a further feature, a user may personalize activities into four hubs. The four hubs may include a professional hub, a personal hub, a hobbies hub and an exploring hub. An example of a personal hub may be "cooking vegetarian food." An example of a professional hub may be "developing Ruby Software language." An example of a hobbies hub may be "listening to rock music." An example of an exploring hub may be "planning beach travel." Each of the hubs has different associated activity graphs from other users. Each of the hubs have different criteria for the skill level of the person in the activity, the highest being the professional hub and the lowest being the exploring hub. Each hub may have differing security levels.

Each hub may also contain a to-do list that user can schedule their time in every week on subjects associated with the hub that they want to improve. The system 100 in FIG. 1 will send the reminders and notification of items in the to-do list. As users are browsing the feed items from their friends and social network in each hub, the system assists users to plan their feed items into these to-do lists so that they can follow up later. Users may search any guidance in the form of other user posts based on the activity that they are trying to do. As will be explained below, the system helps a user find and plan these appropriate guidances for these activity graphs using its pre-association of different blog entries to an activity graph with details like guidance type and time takes to complete as entered by the blogger. Users may also start creating projects and collaborate with other people in their network or out of their network.

Another feature that may be incorporated with the system for personalized data gathering in FIG. 1 may be the incorporation of blogs. A bloggers using the system in FIG. 1 will tag every blog post to provide guidance to an activity graph that they intend to improve. Users who personalized these activity graphs into one of the four hubs receive automated alerts, notifications, in their news feed items without following the people/authors of blogs. For example, users who follow "Cooking Veg Food" in a personal hub, will automatically get any vegetarian recipes being posted by a blogger. Users who follow the activity of "developing Ruby Software language" in their profession hub will automatically receive a news feed in their professional hub when another user writes a blog post relating to the activity. Users who follow the activity of "listening to rock music" in their hobbies hub will receive an alert automatically when another user writes a blog post on any album review. Users who follow the activity of "planning beach travel" in their exploring hub will automatically receive an alert when another user writes a blog post on travelling to beach.

The guidances may be displayed in the form of cards as explained above. The card format for a card representing a guidance may include guidance information such as the activity that the guidance improves (this is the activity graph that is being associated with the guidance), the title, the author, a picture of the author, a guidance thumbnail, a description, the time it takes to complete the guidance, and sharing information. In the case of a public or private event, the card contains additional information such as location, date and time. In the case of a product or service review or a recommendation, the card may contain additional information on the product or service. In the case of actionable DIY guides, the card contains additional actionable times. The cards may include a "call-to-action" buttons to offer personalization. Typically, such buttons include plan, check-in, favorite, review or recommend that allow the guidance to be sent to the user's social network.

The guidance data may be used in an assistance framework operated by the system for personalized data gathering. The assistance framework allows a user to share conversations and questions and answers. As explained above, for any specific activity, while starting a question or a conversation, users have to associate an activity that these belong to using the activity graph. While questioning, answering or having conversations, a user may re-use the guidance available in the activity hub in order not to re-write the same content again. The activity hub uses the card interface described above to show the snippet of the guidance information.

The system in FIG. 1 also includes a project guide feature that brings several guidances together and provides a project guide. For example, a cooking DIY guide to cook vegetarian food dinner under 200 calories may be available and a running story that talks about "run every day a mile" may be available. A third user may put these guidances together and create a project term named "Healthy Hobby" that would include the cooking vegetarian food under 200 calories guidance and a daily "run every day a mile" guidance. The system also provides projects where users can collaborate with other users and plan, track and accomplish project goals. Such projects are also associated to an activity graph. The system 100 tracks each guidance and determines how many users have accessed the guidance card. The system allows the author of the guidance to then determine which users have accessed the guidance and how they have used it.

The system 100 also provides the ability of users to create teams (groups) which help to collaborate on projects, to-dos, and messaging. Teams are each also associated to an activity graph. A team is a group of people with a common activity of interest. The projects and teams may be associated to a hub since a hub is personalization of an activity graph that a user wants to focus on. Each hub allows a user to follow the activities of a user's interest using an activity graph, manage to-do's in pre-scheduled time, find other people who have similar interests, create/manage teams of people for faster messaging and managing activities and create/manage/track projects and goals. Projects may be directly created from project guides which provide all or part of the guidance needed to accomplish projects/goals. The system 100 may include a project guidance that is collection of various guidances such as stories, actions, conversations and question & answers. Projects may be directly created out of the project guidance where all guidance cards associated with the project may be planned and organized at single place.

The personalized data gathering system 100 allows every blog post to be usable, personalizable and actionable. The system associates guidance for every activity using an activity graph. When a user enters a blog, the system asks the user a guidance type to be associated with the blog. Explanatory text may be displayed how entry of guidance type allows the user to help improve the activity that is being associated with the guidance type in an activity graph. For example, a guidance type may include readable guidance, actionable guidance, public and private/friendly events, conversations and questions and answers. The readable guidance type may include the guidance categories of story, ideas, lessons learnt, reviews or recommendations of a product, service, restaurant, book or music. The actionable guidance may include guidance categories of do it yourself (DIY) guide, a DIY thing to-do, a DIY step by step instructions, and a DIY check list guide. The public and private/friendly events allow a user to identify events of interest. The questions and answers guidance type allows a user to identify the blog is a question and answer type of information. The system also prompts the calculated time to read or take action on the specific guidance provided by the blogger. The system 100 may include database schema for the other websites with similar information.

Thus, the system 100 provides a distributed, personalized, social search engine for guidances related to activities. In the present system 100, everything available to a user is an activity. The system 100 asks the user what the user wants to do via the user interface. The solution to this query is an activity having two parts, an action verb part and a completion part. The action verb includes an action verb infinitive as well as an associated attribute name and attribute type. The attribute types include topics, skills, interests, locations, people, products, services and focus areas. The completion thus may include using tasks or to do lists, using projects, reading guidances, using actionable guidances, and using messages, conversations or questions and answers. For example, an action of develop Python may include the action verb infinitives of to program, to code and to develop. The action may also include the attributes of a skill of python language, the local attribute of Python meetings, the developer of a person, and the topics of Django and Python extensions. Another example may be the action of cooking vegetarian food may include the infinitives "to cook" and "to dine."

The determination of the action verb will be explained below. The system 100 allows a user to accomplish the completion part in two ways. The completion part may be accomplished by a user without using guidance by directly creating tasks and projects, collaborating with all of the social connections of the user or anybody with similar interests from public or local people. The completion part may also be accomplished by using guidances available and eventually personalizing the guidances into tasks/projects. These may be also be offered as collaboration with all social connections or anybody from public or local nearby people. For example the system 100 allows a user to obtain the best, fastest, and cheapest possible products for running a 5 k marathon. Another example is that the system 100 may provide a user the fastest, cheapest services available for caring for a baby in Boston, Mass. and even book them. Another example is the system 100 providing a user the cheapest way to find a professional attorney who can file patent start in next 15 minutes. In these examples, the action verbs are "Running a 5 k Marathon" "caring for a baby" and "filing a patent." The corresponding activity rank contains the exact match of action verb and attribute values (skills, topics, interests, people, locations, products and services) and the completion of using guidance rank or without using the guidance rank by directly creating tasks/projects.

Figure 13:
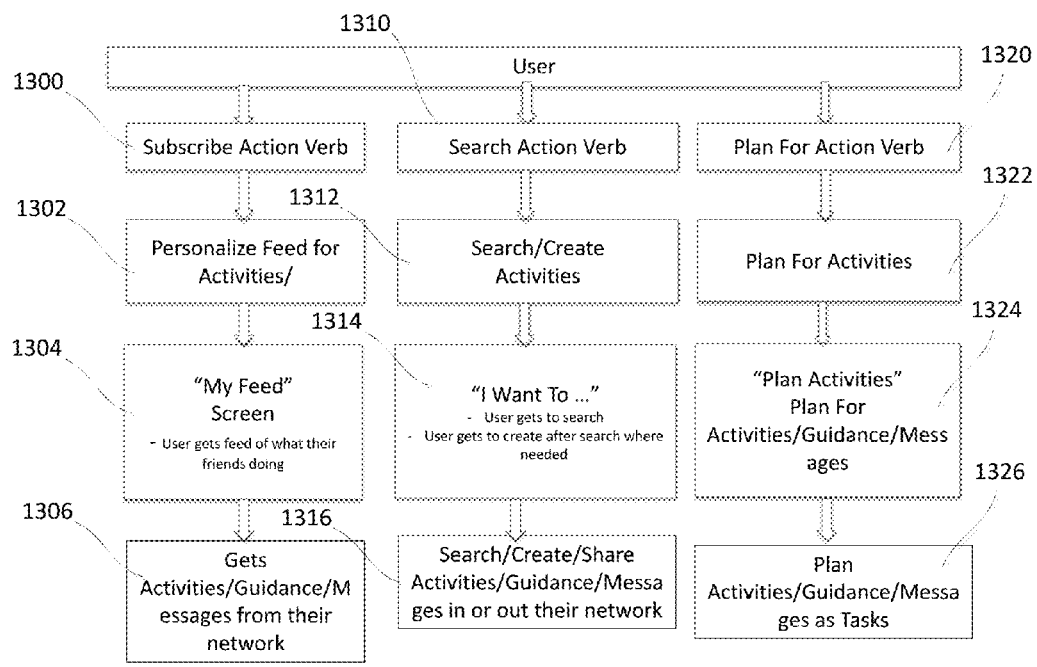
FIG. 13 is a flow diagram showing the activity system flow available to a user of the system 100 in FIG. 1 in relation to subscribing, search for or planning for action verbs.

FIG. 13 is a flow diagram showing the activity system flow available to a user of the system 100 in FIG. 1 in relation to subscribing, search for or planning for action verbs. A user may subscribe to an action verb (1300). For example, the user may subscribe to an action verb (action plus attribute) such as "cooking" by selecting a choice in the user interest GUI 502 in FIG. 5. The user may then personalize the feed to the interface for the activities associated with the action verb (1302). The user may be provided with a screen feed that includes an update of any actions by friends associated with the activity (1304). The user may also be provided with activities, guidance or messages from their network of users associated with the activities associated with the action verb (1306).

The process outlined in FIG. 13 also allows a user to search for an action verb. The user inputs a particular action verb of interest to the system 100 (1310). The system 100 will search for activities associated with the action verb. The user may then either search for or create activities associated with the searched for action verb (1312). The user may also input "I want to" that searches for a list of possible activities associated with the selected action verb and how a user would complete the activity such as through a guidance or creating an activity (1314). The user may search, create or share activities, guidance or messages in or outside of their network (1316).

The process outlined in FIG. 13 also allows a user to plan for performing a selected action verb (1320). The user may plan for activities associated with the action verb via a plan control on a card associated with a guidance (1322). The user may then plan activities associated with the action verb that is added to the individual user plan (1324). The user may also "plan specific activities such as guidances or messages as tasks for individual plan (1326). The user may also plan activities, guidance or messages in or outside of their network.

Figure 14:
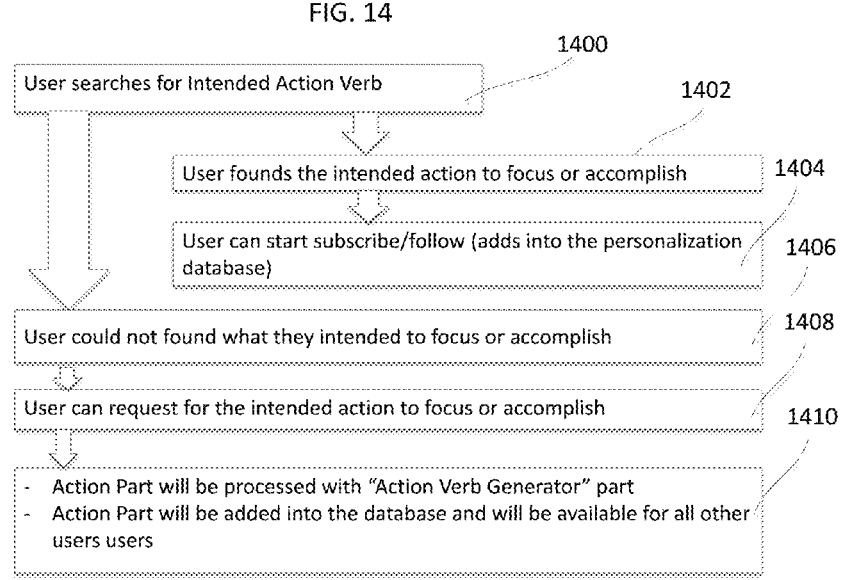
FIG. 14 is a flow diagram of a new user search request routine followed by the system 100 when a user desires to search for an action verb.

FIG. 14 is a flow diagram of a new user search request routine followed by the system 100 when a user desires to search for an action verb. The user first searches for an intended action verb via the interface (1400). The search may include a list of action verbs in the database or a text field allowing a user to enter a search term. If the user finds the intended action (1402), the user may subscribe or follow the action that adds the action into the personalization database 107 in FIG. 1 (1404).

If the user does not find the intended action (1406), the user may request the intended action to focus or accomplish (1408). The system 100 will send the request to the action verb generator routine. The action part will be processed with an action verb generator and if the action verb generator finds a similar verb and actions for attributes and values. If no similar verb request is found, a message will be sent to the user. The action part will be added into the database 107 in FIG. 1 and may be made available to other users searching for the action verb (1410).

Figure 15:
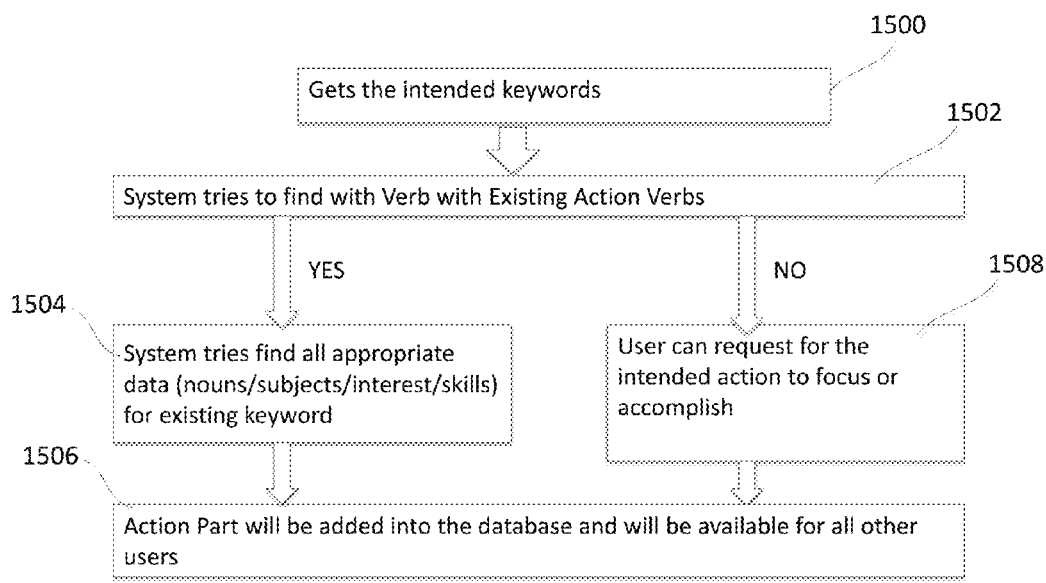
FIG. 15 is a flow diagram of the process of obtaining actions performed by the system 100 in response to a request from a user.

FIG. 15 is a flow diagram of the process of obtaining actions performed by the system 100 in response to a request from a user. The system 100 first gets intended keywords entered by the user in response to the query "I want to" (1500). The system 100 then attempts to find the verb in the query with existing action verbs (1502). If the system finds the existing action verbs, the system will attempt to find all appropriate data such as subjects, interests, skills, etc. for the existing keyword (1504). The action part will then be added to the database 107 and will be available for other users (1506). If the system does not find the existing action verb, the user may request the intended action that causes the system to parse the keywords in the request and determine the English verbs and determine the action verb and attribute in the request (1508). The activity is then added to the database 107 (1506).

Figure 16:
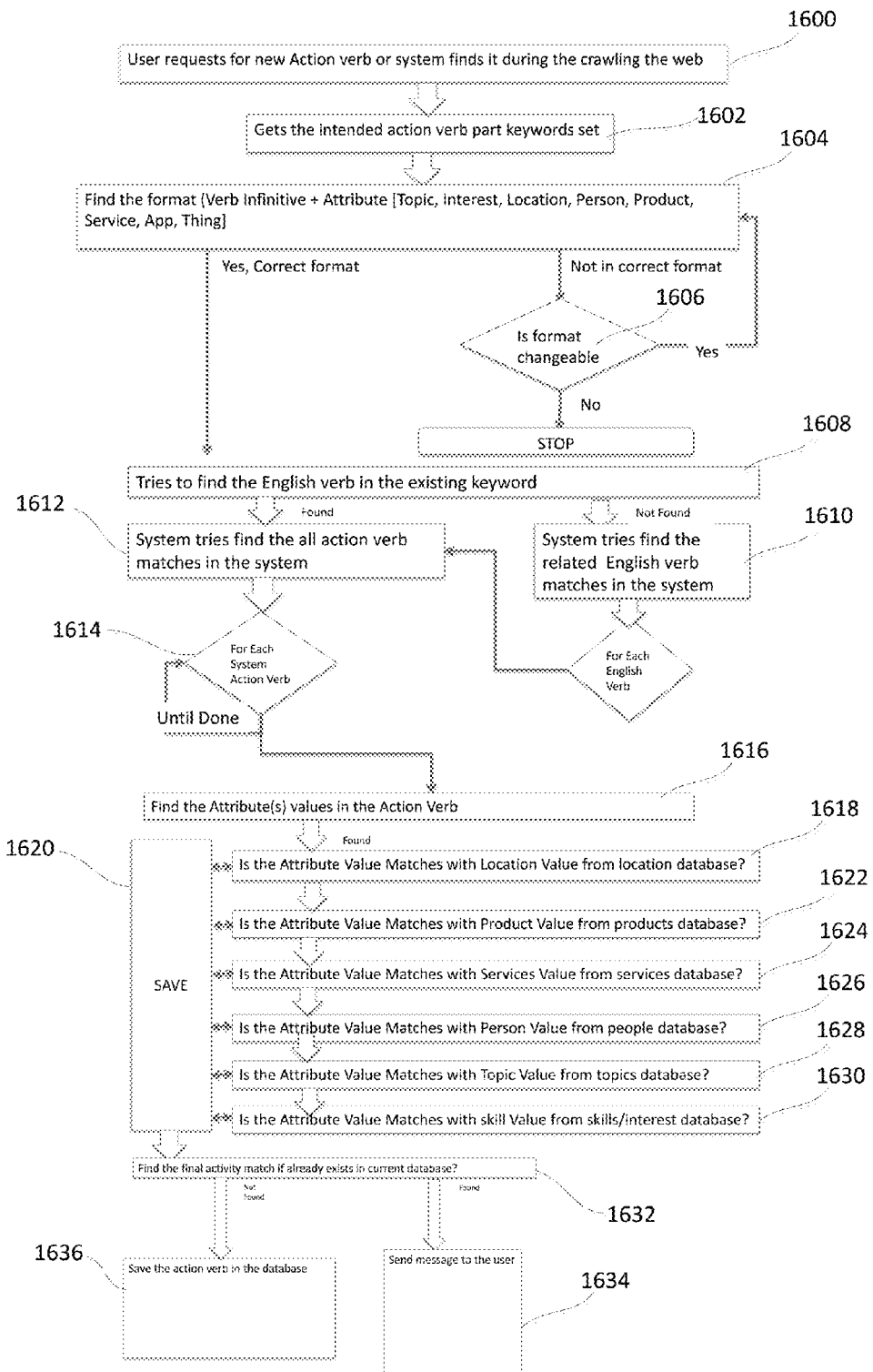
FIG. 16 shows the process of the generation of a new action verb.

FIG. 16 shows the process of the generation of a new action verb. A user may either request a new action verb, or the system 100 will search for a new action verb by employing a web crawler routine to crawl the web (1600). After receiving the request, the system 100 receives the intended action verb keyword sets from the user input (1602). The system 100 determines the format of the intended action verb (1604). As explained above, the proper format in this example is a verb infinitive plus an attribute. The attribute may be for example a topic, interest, location, person, product, service, application or thing. If the verb is not in the correct format, the system 100 determines if the format is changeable (1606). If the format is changeable, the system 100 alters the format to a compatible format. If the format is not changeable, the system 100 will stop the process and inform the user.

Once the verb is in the correct format, the system 100 attempts to find the English verb in the existing verb database from the database 107 (1608). If the English verb is not found, the system 100 attempts to find related English verb matches in the verb database (1610). The system 100 then finds all action verb matches in the system for each English verb or related verb (1612). This process is repeated to group each action verb stored in the database 107 associated with the verb (1614).

After all action verb matches are found, the system finds the attribute values in the action verb (1616). The system then determines if the attribute value matches with a location value from the location database that is part of the database 107 (1618). The location value, if any, is saved (1620). The system then determines if the attribute value matches with a product value from the product database that is part of the database 107 (1622). The product value, if any, is saved (1620). The system then determines if the attribute value matches with a services value from the services database that is part of the database 107 (1624). The services value, if any, is saved (1620). The system then determines if the attribute value matches with a person value from the person database that is part of the database 107 (1626). The person value, if any, is saved (1620). The system then determines if the attribute value matches with a topic value from the topic database that is part of the database 107 (1628). The topic value, if any, is saved (1620). The system then determines if the attribute value matches with a skills/interest value from the skills/interest database that is part of the database 107 (1639). The skills/interest value, if any, is saved (1620).

After saving all applicable attribute values, the system determines whether the final activity match is already existing in the current database (1632). If the activity match is found, the system sends a message to the user indicating that the verb already exists and there is no need to add the verb (1634). If the activity match is not found, the system saves the action verb in the database 107 as a new action verb (1636).

The personalization of action verbs may be performed by a user via the system 100. The user may follow the personalized action verbs. The action verbs may be personalized in four areas, personal activities, professional activities, hobbies and exploring activities. The activities may also be classified as local which provides a user the option to designate the activity as something in the vicinity of the user's location.

Thus, each activity has a flow where the user may follow the process in personalization. The user may establish a plan. The user then checks-in or completes the activity. The check-in or completion is broadcast to any persons within the user's network. The user may designate the activity as a favorite that broadcasts to the user's network. The user may also recommend the activity to other users in the user's network.

Similarly, each guidance may also be personalized into an activity that has a similar flow. The user first plans to perform a guidance based on a guidance card. The user then checks-in or completes the guidance. The check-in or completion is broadcasted to any persons within the user's network. The user may designate the guidance as a favorite that broadcasts to the user's network. The user may also recommend the guidance to other users in the user's network Each message may be personalized in terms of a question and answer card. The user first plans to review questions and answers. The user then checks-in or completes the questions and answers. The check-in or completion is broadcasted to any persons within the user's network. The user may designate the questions and answers as a favorite that broadcasts to the user's network. The user may also recommend the questions and answers to other users in the user's network.

Figure 17:
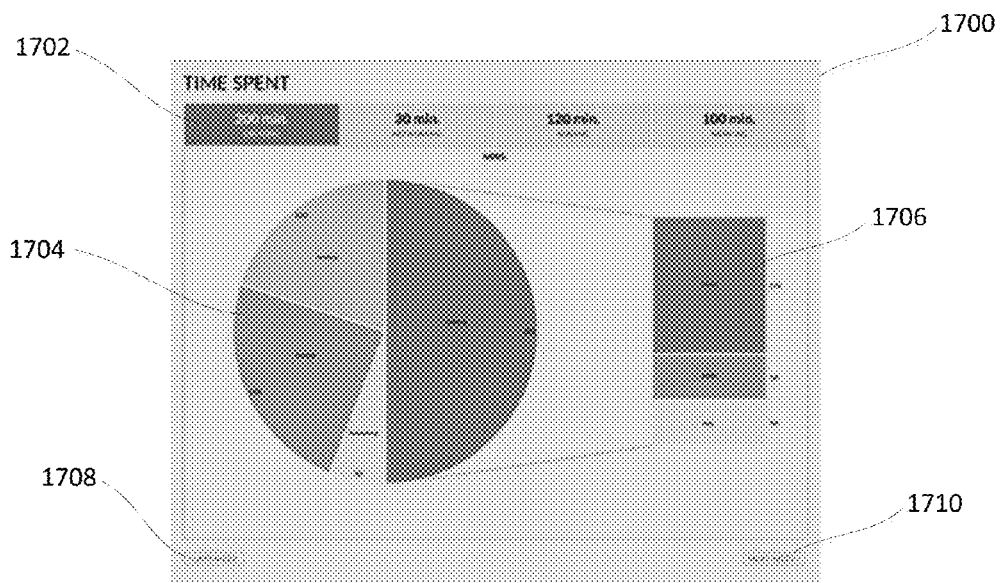
FIG. 17 shows an activity graph screen.

FIG. 17 shows an activity graph screen 1700 that may be displayed by a user on a user computing device such as the user device 501. The activity graph screen 1700 includes data relating to time spent by a user during a week. A summary bar 1702 shows the amount of time spent on different activities. In this example 200 minutes were spent on creating, 30 minutes on networking, 120 minutes on reading and 100 minutes on working. The system 100 tracks the number of minutes each guidance should take to complete. For example, every reading guidance has a property termed time to read. Every actionable guidance has properties of reading time and action time." The reading times may be automated by number of words in the guidance. Every conversation guidance and every question and answer guidance has a property termed time needed to follow up that calculates how many users interacted so far and how many words are included. In this example the system 100 calculates the time to read all the words and assumes 10 minutes per conversation to write. The total time is the total length of the conversation so far and time for writing. The time data may also be used by users that personalize or plan any of these guidances into their tasks and the system 100 shows the possible time needed to allocate for the tasks.

These activities in the summary bar 1702 are also summarized in a pie graph 1704 that shows the time a user spends in each activity. The activity graph 1700 also includes a specific activity bar graph 1706 that is displayed by selecting a specific activity from the summary bar 1702 or the pie graph 1704. The specific bar graph 1706 contains a further breakdown of activities performed within the activity. For example, the user has selected the creating activity and therefore the bar graph 1706 shows the time spent on three different activities associated with creating. The system 100 stores the time spent by a user performing the activities. The user may navigate to different weeks from the activity graph screen 1700 using a last week button 1708 or a next week button 1710.

Figure 18A:
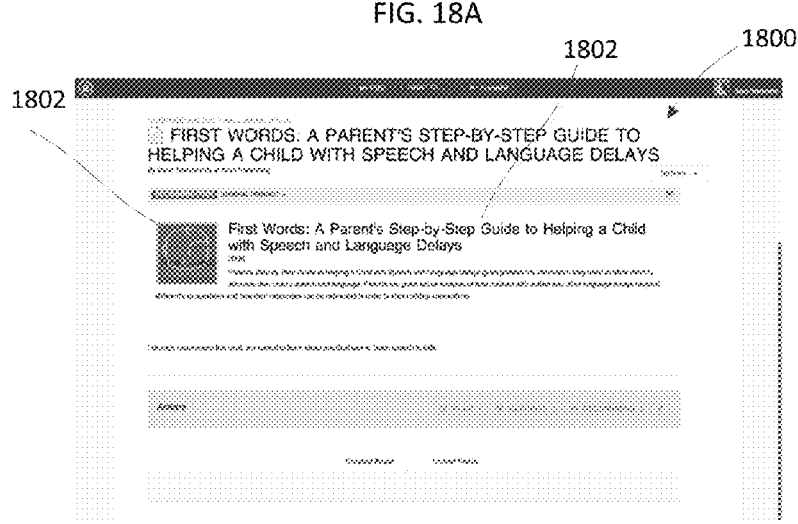

FIG. 18A is a screen image of an example guidance card 1800 that is a guidance product recommendation. The example card 1800 includes a product review of a book associated with parenting. The example card 1800 includes a description 1802 of the product and a recommendation field 1804 including comments from other users.

Figure 18B:
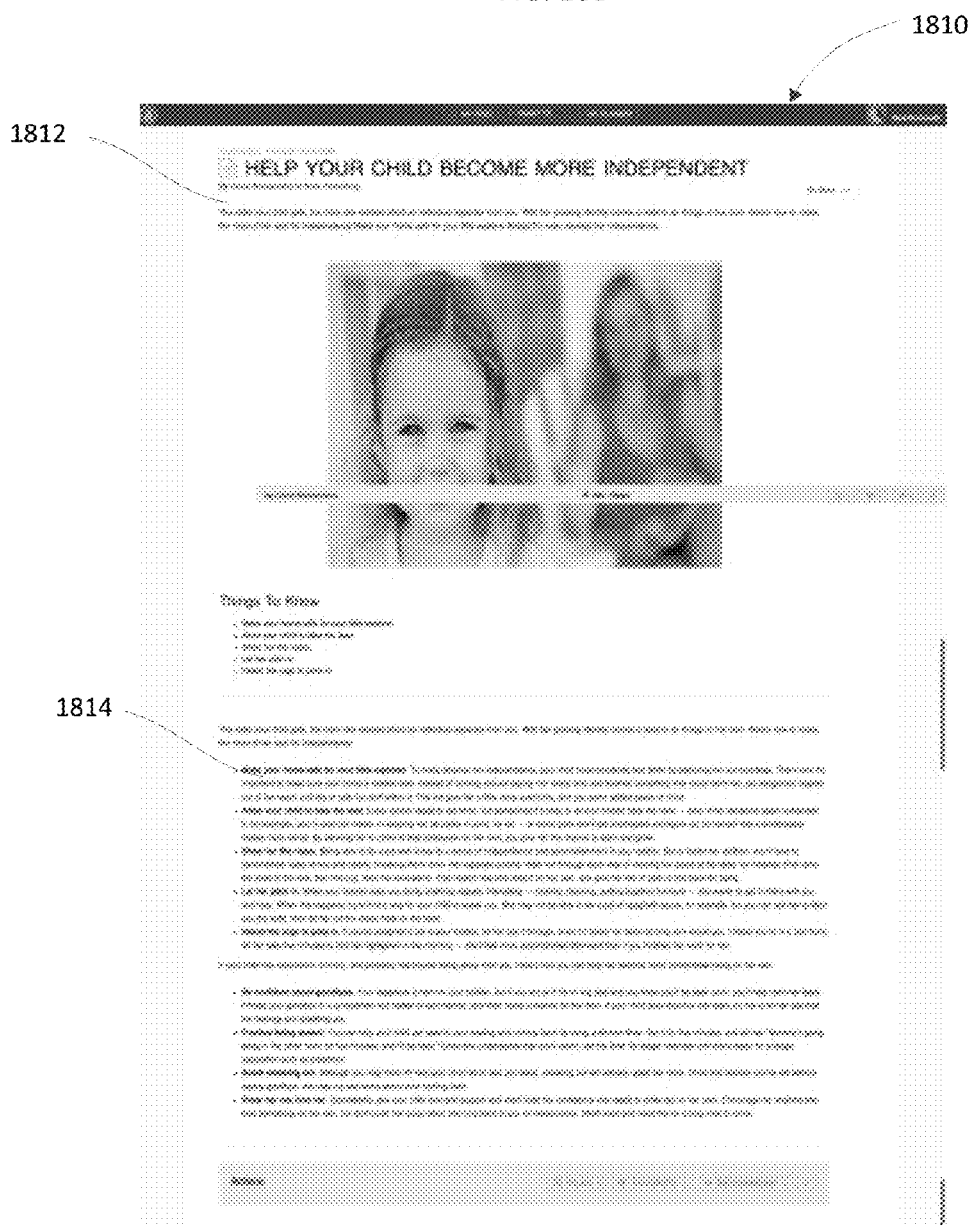

FIG. 18B is a screen image of an example guidance card 1810 that is a guidance story. The card 1810 includes a summary field 1812 and a descriptive text field 1814 relating to a story relating to parenting.

Figure 18C:
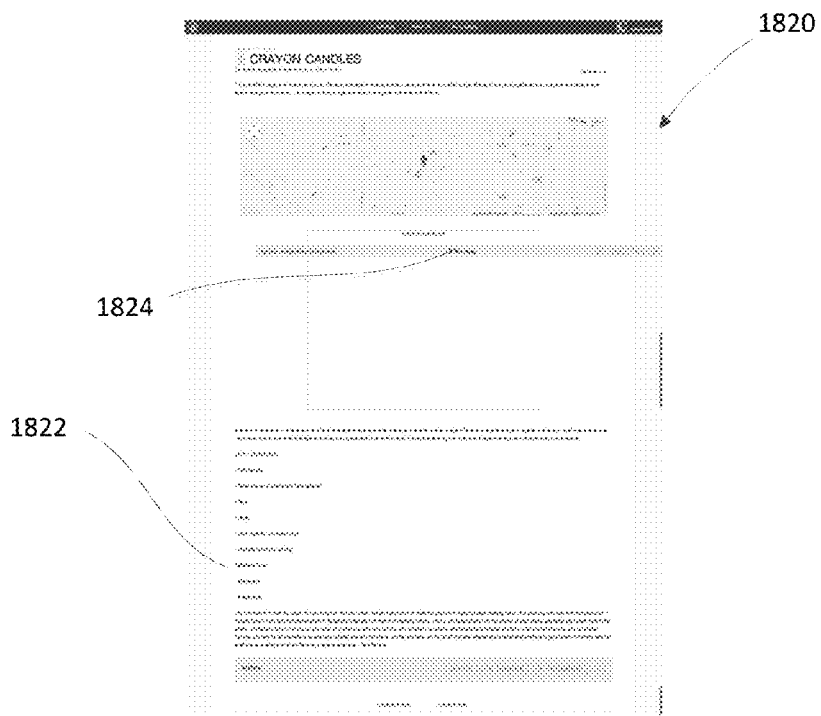

FIG. 18C is a screen image of an example guidance card 1820 that is an activity guidance. The activity guidance card 1820 includes a description 1822 of the activity and time information 1824 of the time required to perform the guidance. The description 1822 includes instructions, lists of materials, photographs and other information necessary to perform the activity.

Figure 18D:
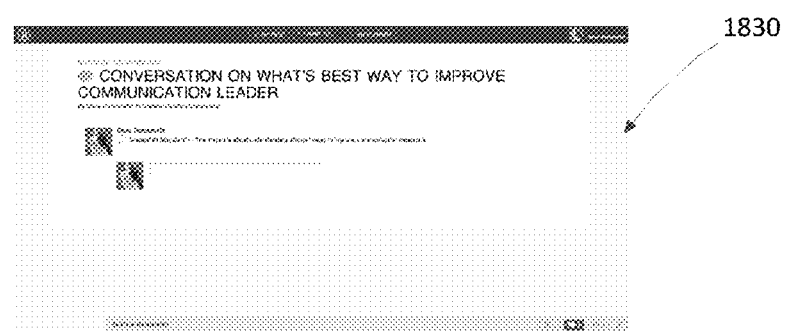

FIG. 18D is a screen image of an example guidance card 1830 that is a conversation guidance. The guidance card 1830 includes entries from users that form a conversation between users on a subject such as communication in this example.

FIG. 18E is a screen image of an example guidance card 1840 that is a question and answer guidance. The guidance card 1840 includes a series of questions and answers in the field of children's sports in this example.

Figure 18F:
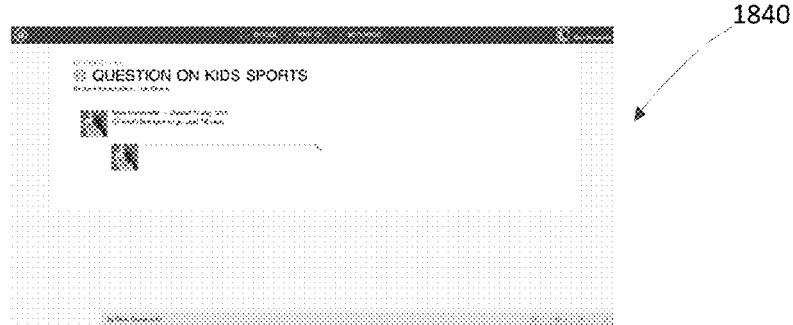
Figure 18F:
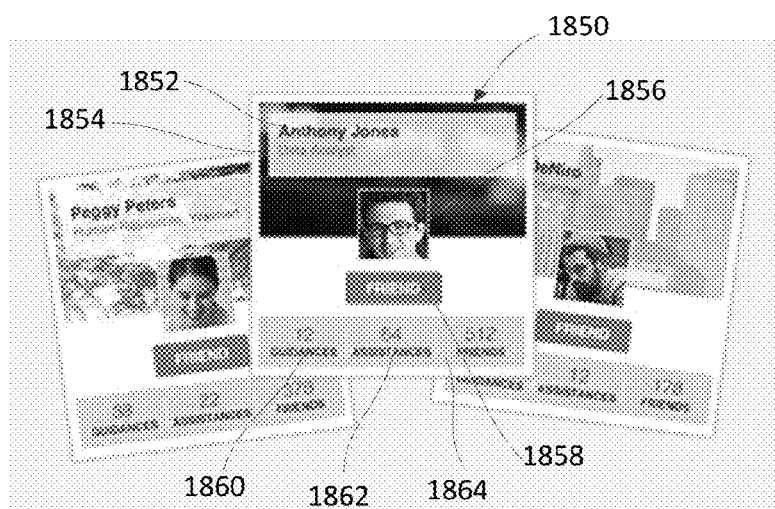

FIG. 18F is a screen image of an example user card 1850. The example user card 1850 includes the user name 1852, the user title 1854, and a user picture 1856. The status of the user may be designated in a relationship field 1858. In this example the status of the user is a friend, but other status designations such as followers, group members, like minded persons, neighbor or professional may be used. The user card also includes a guidance tab 1860, an assistances tab 1862 and a friends tab 1864. Each of the tabs 1860, 1862, and 1864 include the number of the associated entries for each. Selecting one of the tabs will show the guidance cards, assistance cards or friend cards associated with the user.

Figure 18G:
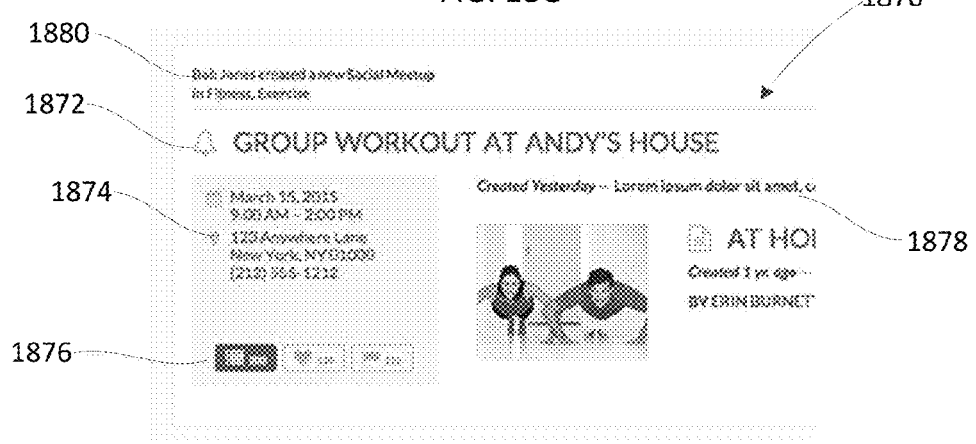

FIG. 18G is a screen image of an example event card 1870. The event card 1870 includes a title field 1872, a date and location field 1874, a social network field 1876 and a description field 1878. The event card 1870 also includes a creator field 1880 that indicates the user that created the event and the associated activity. The social network field 1876 includes a chart icon allowing a user to add the event to planned events, a heart icon allowing the user to designate the event as a favorite and a flag icon that allows a user to recommend the event to friends, followers and neighbors. Other social network icons may include a check-in icon that allows a user to designate the completion of the planned activity and marked as useful to show in timeline, a remove icon that removes the event from the planner and a rating icon used for tracking the average rating of the event.

Figure 19A:
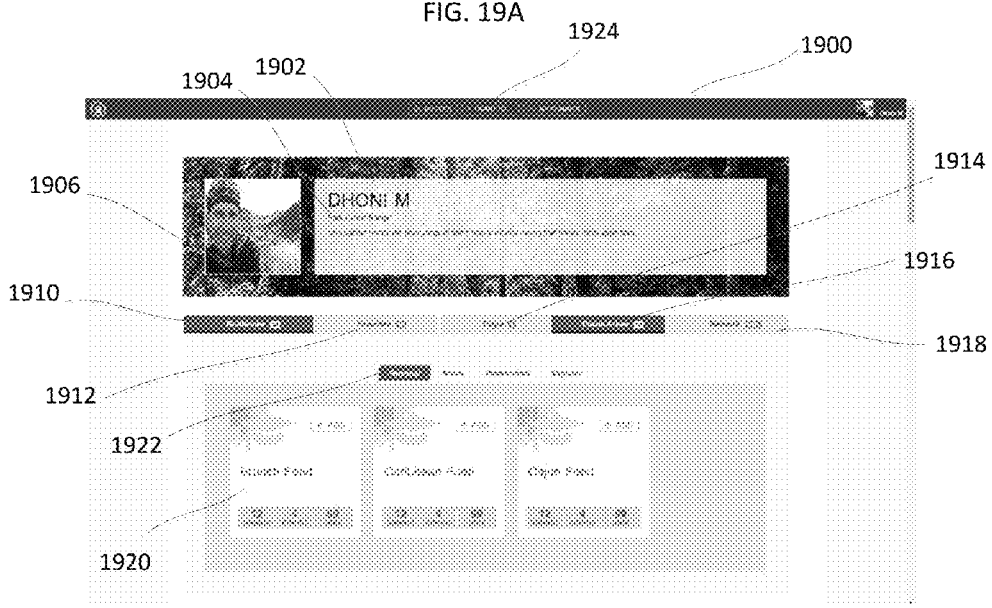
FIG. 19A is an image of a user profile screen.

FIG. 19A is an image of a user profile screen 1900 presented on the user device 501 in FIG. 5. The user profile screen 1900 includes a user name 1902, user title 1904, and a user picture 1906. The user profile screen 1900 includes a guidances tab 1910, a favorites tab 1912, a plans tab 1914, a focus areas tab 1916 and a network tab 1918. Selection of any of the tabs 1910, 1912, 1914, 1916 or 1918 will display all cards relating to the subject of the tab. The example in FIG. 19 shows the guidances tab 1910 selected and the focus areas tab 1916 selected. Thus, a series of focus area cards 1920 are displayed. The focus area cards 1920 may be further sorted by selecting the category of guidance via guidance category tabs 1922. As explained above, each category of guidance, professional, personal, hobbies or explorer may be viewed by selecting the corresponding tab. As explained above, a user may add guidances to each of the four categories. The user profile screen 1900 includes navigation buttons 1924 that allow a user to view their feed, make a search (via the "I want to") and view their planner.

Figure 19B:
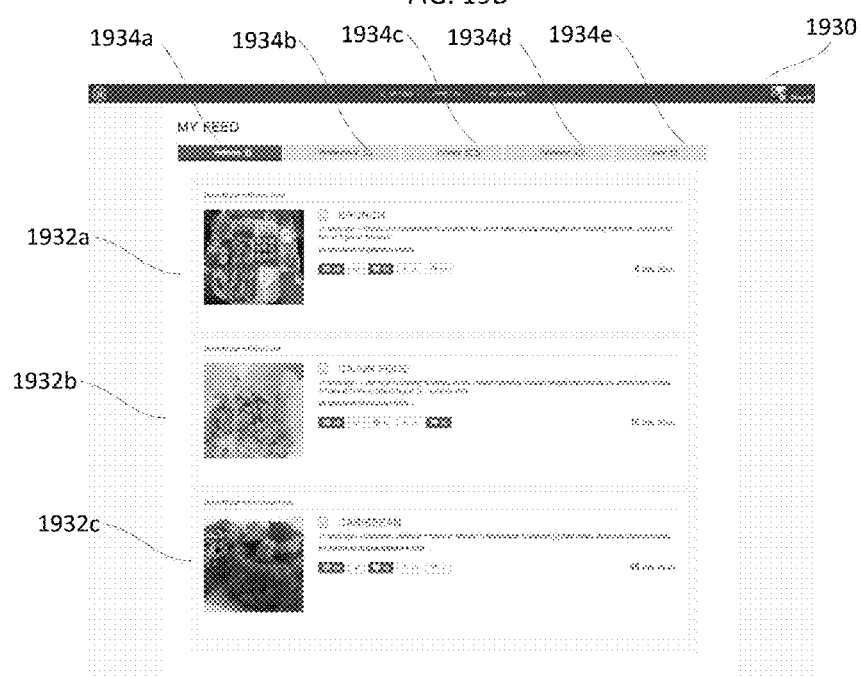
FIG. 19B is an image of a user my feed screen.

FIG. 19B is an image of a user my feed screen 1930 that may be accessed on the user device 501 in FIG. 5. The my feed screen 1930 shows activity cards 1932a-1932c in different categories. A series of tabs 1934a-1934e allows a user to see different feeds from users in their network in the personal groupings of hobbies, professional, friends, followers and local. In this example, the hobbies tab 1934a has been selected, and cards relating to different activities for hobbies of the user are displayed. In this example, an event card 1932a, an activity card 1932b and a guidance card 1932c are displayed because they are associated with the hobby of cooking.

Figure 19C:
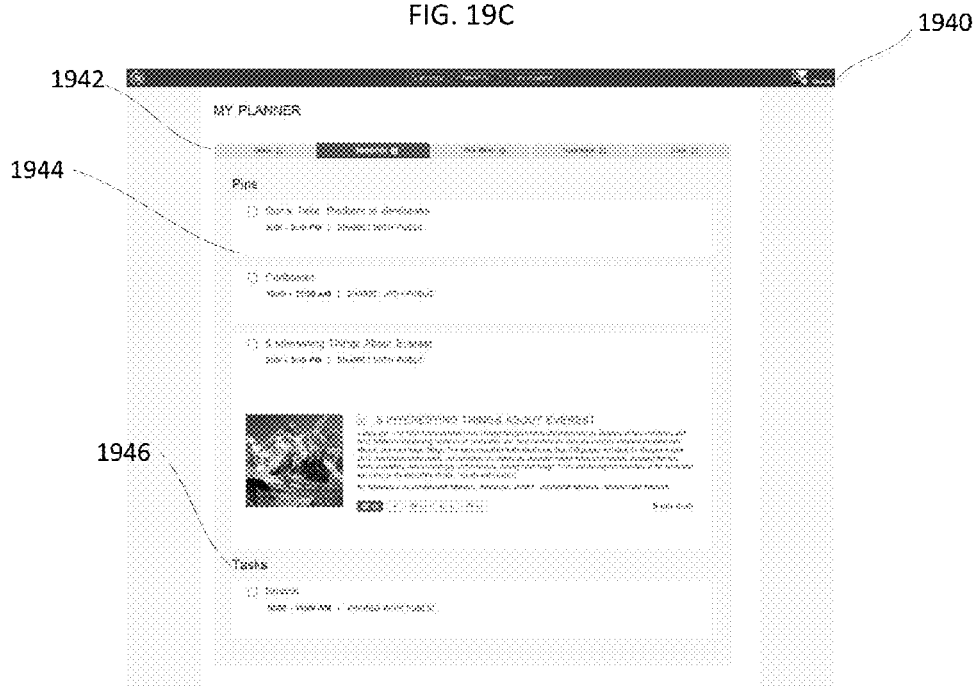
FIG. 19C is an image of a planner screen.

FIG. 19C is an image of a planner screen 1940 that is displayed on the user device 501 in FIG. 5. The planner screen 1940 includes time tabs 1942 that show activities scheduled during the time period. The tabs include a today tab, a tomorrow tab, a this week tab, a next week tab, and a later tab. The planner screen 1940 shows the user has selected the tomorrow tab. The display includes a pins field 1944 that shows scheduled events and appropriate times and descriptions. The events may be public or private. The display also includes a tasks field 1946 that show events the user has scheduled.

Figure 19D:
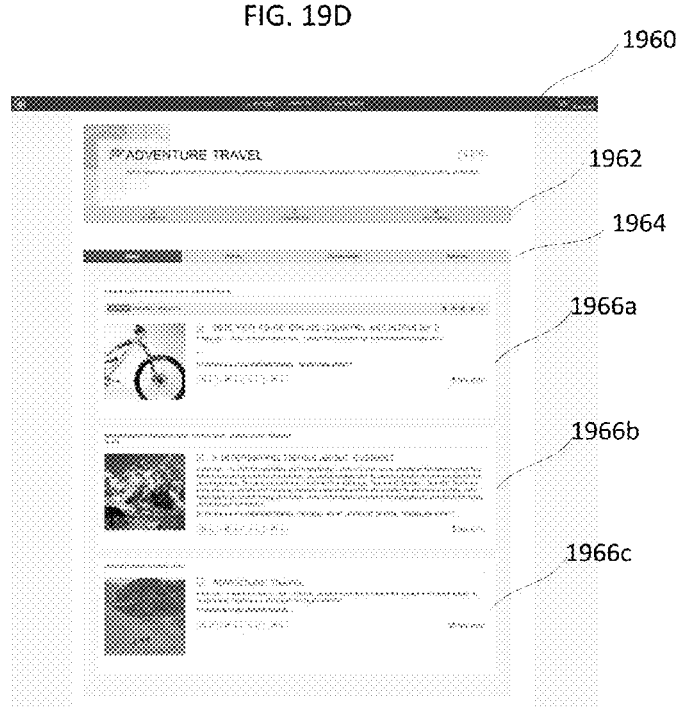
FIG. 19D is an image of a focus area interface screen

FIG. 19D is an image of a focus area interface screen 1960. The focus area interface screen 1960 includes combinations of any of the seven attributes, a topic, interest, location, person, product, service, application or things, explained above. A navigation bar 1962 includes buttons for activities associated with the focus area, guidances associated with the focus area and users following the focus area. A guidance bar 1964 includes a story tab, an action tab, a conversation tab and a request tab. Selecting the story tab displays guidance cards for story guidances, selecting the action tab displays guidance cards relating to activities, selecting the conversation tab displays guidance cards relating to conversations, and selecting the request tab displays question and answers guidance cards. In this example the focus area interface screen 1960 includes a product guidance card 1966a, a topic card 1966b and a story card 1966c.

Figure 20A:
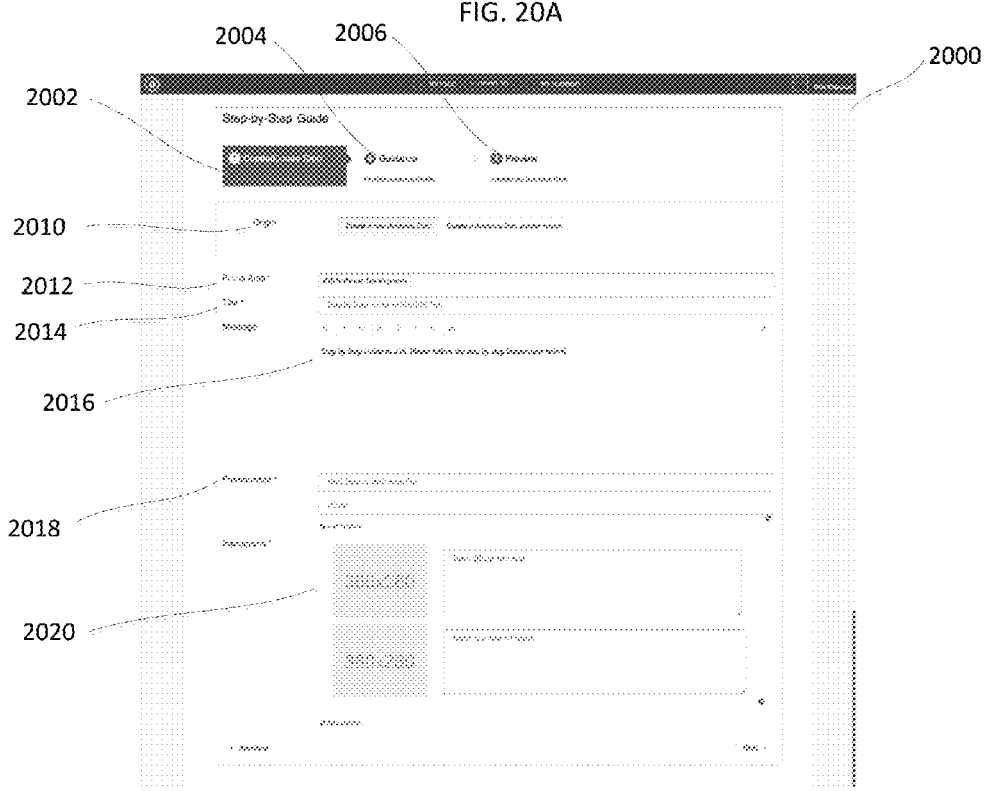
FIG. 20A is a user interface screen that allows the creation of an activity guidance.

FIG. 20A is a user guidance creation interface screen 2000 that allows a user to create an activity guidance. The guidance creation interface 2000 includes a create card tab 2002, a guidance tab 2004 and a preview tab 2006. The create card tab 2002 in selected in FIG. 20A and allows a user to create the activity guidance. After entry of the information for the activity, the user may select the guidance tab 2004 that allows a user to extract the appearance of the activity guidance card. The completed guidance may be viewed by selecting the preview tab 2006.

An origin field 2010 allows a user to either create a new guidance by user entry of information or select another source such as a blog to curate the guidance from that source. A focus area field 2012 allows a user to designate the focus area of the activity guidance. A title field 2014 allows the user to enter the title of the activity and a message field 2016 allows a user to enter a message to accompany the guidance card.

The user may select prerequisites for the activity via series of prerequisite fields 2018. The prerequisites are entered by the user either by free text or selection of existing data from the system 100. The user may enter instructions either via text or graphics or photos in the instructions field 2020.

Figure 20B:
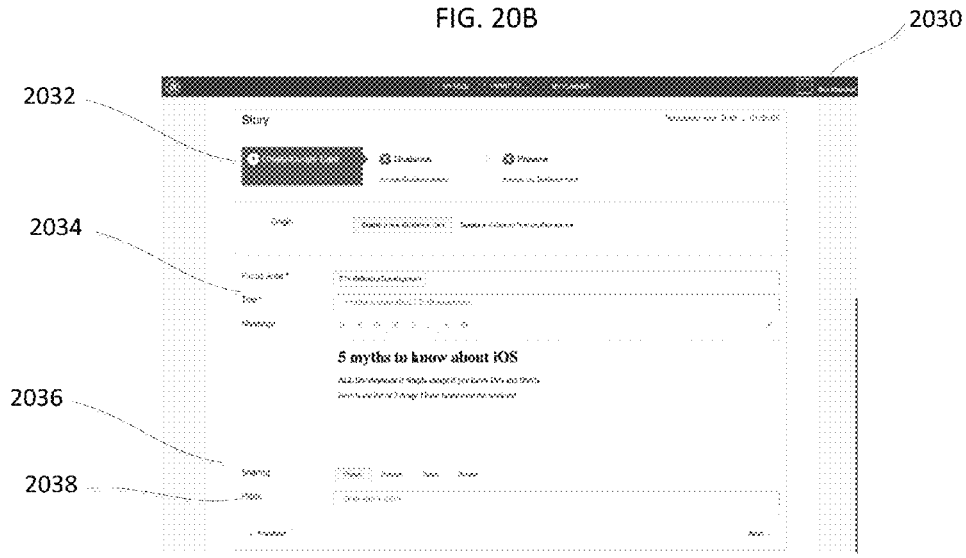
FIG. 20B is a user interface screen that allows the creation of a story guidance.

FIG. 20B is another user guidance creation interface screen 2030 that allows the creation of a story guidance. Similar to the guidance creation interface 2000, the interface 2030 includes a tab section with create, guidance and preview tabs. The create tab has been selected and an information window 2034 with the origin, focus area, title and message fields for the corresponding information is displayed. A sharing area 2036 allows a user to select different groups to share the story guidance with. In this example, the groups may include the public, friends, team or private. A place field 2038 allows a user to enter the location of the user in order to target certain audiences.

Figure 20C:
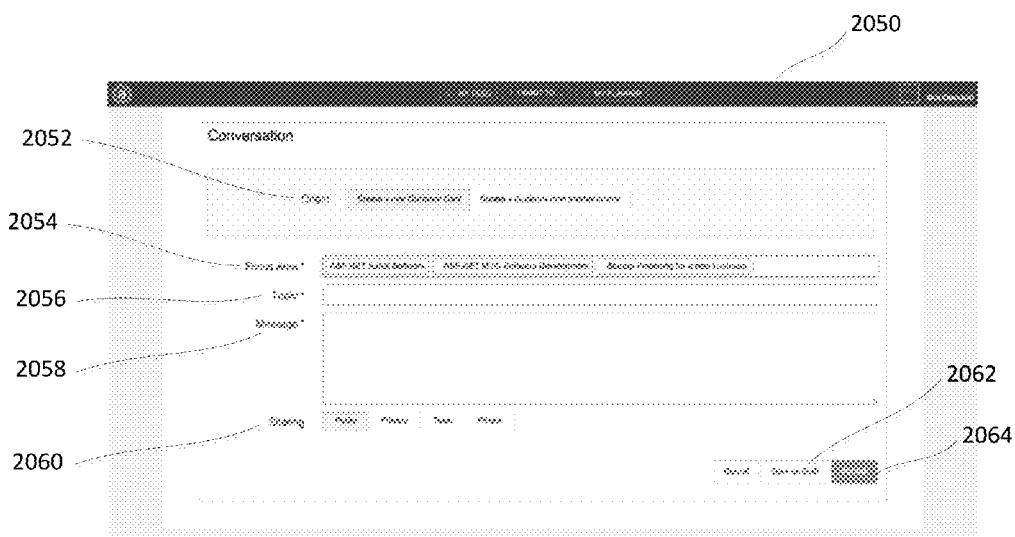
FIG. 20C is a user interface screen that allows the creation of a conversation guidance.

FIG. 20C is another user guidance creation interface screen 2050 that allows the creation of a conversation guidance. The screen 2050 includes an origin field 2052 that allows a user to create a new conversation or provide the conversation from another source. The interface screen 2050 also includes a focus area field 2054, a topic field 2056, and message field 2058 for the user entry of the focus area, topic and message associated with the conversation guidance. A series of sharing buttons 2060 allows the user to share the conversation with groups that include the public, friends, team or private. A save as draft button 2062 allows the user to save the conversation without publishing and a publish button 2064 allows the user to publish the conversation to the designated groups.

Figure 20D:
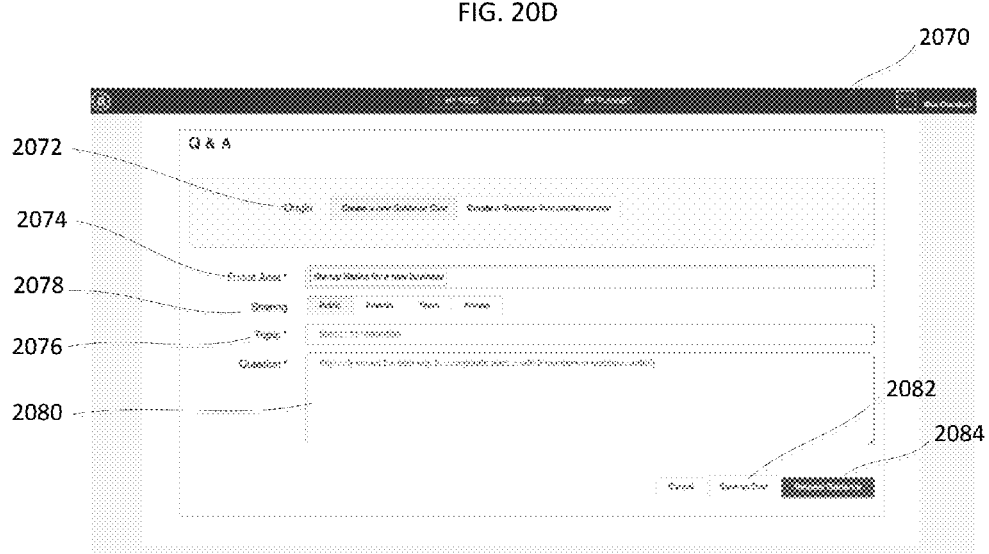
FIG. 20D is a user interface screen that allows the creation of a question and answer guidance.

FIG. 20D is another user guidance creation interface screen 2070 that allows the creation of a question and answer guidance. The interface screen 2070 includes an origin field 2072 that allows a user to create a new question or provide the question from another source. The interface screen 2070 also includes a focus area field 2074 and a topic field 2076 for the user entry of the focus area and topic. A series of sharing buttons 2078 allows the user to share the question with groups that include the public, friends, team or private. The user may enter the question in a question field 2080. A save as draft button 2082 allows the user to save the question without publishing and a request guidance button 2084 allows the user to publish the question to the designated groups.

Figure 21A:
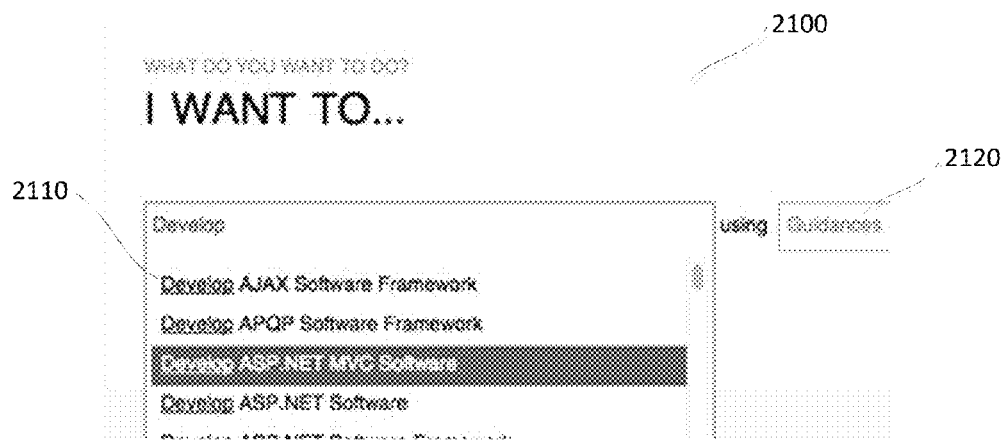
FIGS. 21A-21B are search screens showing a user query and results.

FIG. 21A is an image of a search screen 2100 that is displayed when the user selects the I want to button in the main navigation bar shown in FIG. 19A. The search screen 2100 allows a user to enter a verb. The system 100 will use the process described in FIG. 16 to return results from the database 107. A results box 2110 is displayed that lists all of the activities that are responsive to the verb entered by the user. A guidance selection field 2120 displays selections of guidances associated with a selected activity. The system 100 provides a number of activities under planning by selection of the plan button. Similarly, every personalization button has a count of activities that are going on for each of the guidance cards. This is called number of activities associated with a guidance.

Figure 21B:
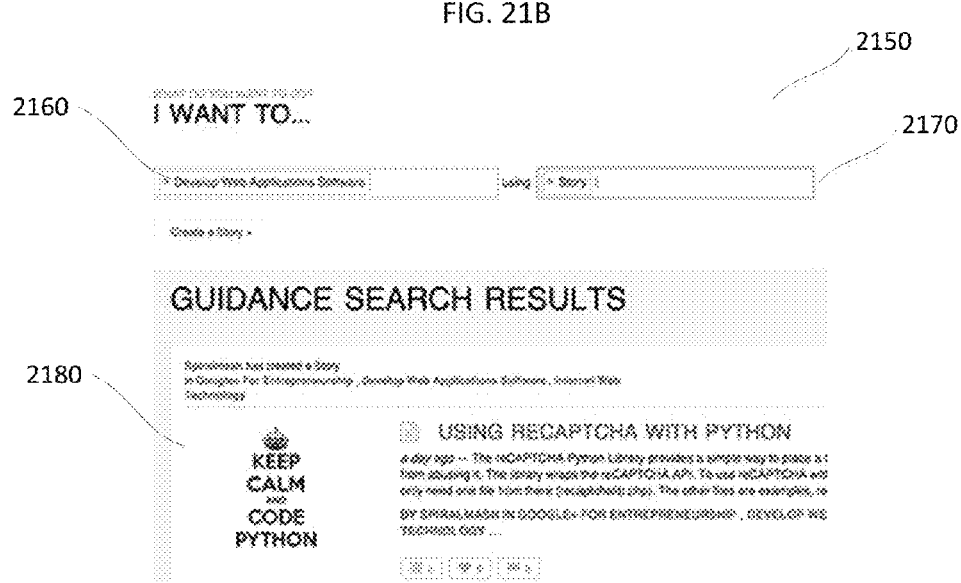

FIG. 21B shows a search results screen 2250 that displays the results of the search process when a user selects a specific activity. In this example, the user has selected the specific activity of "develop web applications software" in the results box 2110 in FIG. 21B. The selection is highlighted in a selection field 2160. The selection of the specific activity is shown in a "using" field 2170 that returns different methods to complete to the activity. The user may complete activities by performing to do, projects or tasks. The user may complete guidances by reading stories or DIY actions. The user may complete activities by participating in conversations and questions and answers. The search results are shown in a field 2180 that shows the selected action verb and the completion part results that are available.

As explained above, the user device 501 may access the network 506 such as the cloud through a network connection, such as through an Internet connectable interface, to access the system running on different servers. The user device 501 may include multiprocessor systems, microprocessor-based or programmable consumer electronics, and the like. As such, the user device 501 running the application described above may range widely in terms of capabilities and features. The user devices may also be a laptop computer, a desktop computer, a work station, or other computer. The user devices may also include virtually any preferably mobile computing device that is configured to send and receive information over a wireless capable network, such as the cloud network. In this example, the user computing devices are web-enabled and may run browser software for the presentation of web pages to the user. Mobile user devices may include portable devices such as cellular telephones, smart phones, display pagers, radio frequency (RF) devices, infrared (IR) devices, global positioning devices (GPS), Personal Digital Assistants (PDAs), handheld computers, wearable computers, tablet computers, integrated devices combining one or more of the preceding devices, and the like.

It is to be understood that two or more computing systems or devices may be substituted for any one of the computing systems or devices in the system 100. Accordingly, principles and advantages of distributed processing, such as redundancy, replication, and the like, also can be implemented, as desired, to increase the robustness and performance of the devices and systems of the system 100.

In this example, certain human operated user devices are generally portable or mobile devices that include geo-referencing hardware and software that allow their location to be known to both their users and the servers. The geo-referencing hardware and software for locating a particular device in this example is based on the Global Positioning System (GPS), but other geo-referencing systems may be used.

As exampled below, the human operated user devices may include a browser application enabled to receive and to send wireless application protocol messages (WAP), and/or wired application messages, and the like. In one example, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and/or send digital information.

The user devices may also include at least one client application that is configured to receive control data and/or content from another computing device via a network transmission. The client application may include a capability to provide and receive textual content, graphical content, video content, audio content, and the like. Moreover, the user devices may be further configured to communicate and/or receive a message, such as through a Short Message Service (SMS), direct messaging (e.g., Twitter), e-mail, Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between or with another computing device, and the like.

The cloud network is configured to allow communications between one computing device and another computing device. The cloud network may be enabled to employ any form of computer readable media for communicating information from one electronic device to another. On an interconnected set of LANs, including those based on differing architectures and protocols, a router and/or gateway device acts as a link between LANs, enabling messages to be sent between computing devices. Also, communication links within LANs typically include twisted wire pair or coaxial cable, while communication links between networks may utilize analog telephone lines; full or fractional dedicated digital lines including T1, T2, T3, and T4; Integrated Services Digital Networks (ISDNs); Digital Subscriber Lines (DSLs); wireless links including satellite links; or other communication links known to those of ordinary skill in the art. Furthermore, remote computers and other related electronic devices can be remotely connected to either LANs or WANs via a modem and temporary telephone link.

The cloud network may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. The cloud network may also include an autonomous system of terminals, gateways, routers, and the like connected by wireless radio links or wireless transceivers. These connectors may be configured to move freely and randomly and organize themselves arbitrarily, such that the topology of the cloud network may change rapidly and arbitrarily.

The network may further employ a plurality of access technologies including 2nd (2G), 2.5, 3rd (3G), 4th (4G) generation radio access for cellular systems; WLAN; Wireless Router (WR) mesh; and the like. Access technologies such as 2G, 3G, 4G, and future access networks may enable wide area coverage for mobile devices with various degrees of mobility. For example, the network may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. The network may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, the cloud network may include virtually any wired and/or wireless communication mechanisms by which information may travel between one computing device and another computing device, network, and the like.

The above described flow diagrams are representative of example machine readable instructions the routines operated by the system 100 in FIG. 1. In this example, the machine readable instructions comprise an algorithm for execution by: (a) a processor, (b) a controller, and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowcharts above may be implemented manually. Further, although the example algorithm is described with reference to the flowcharts, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Figure 22:
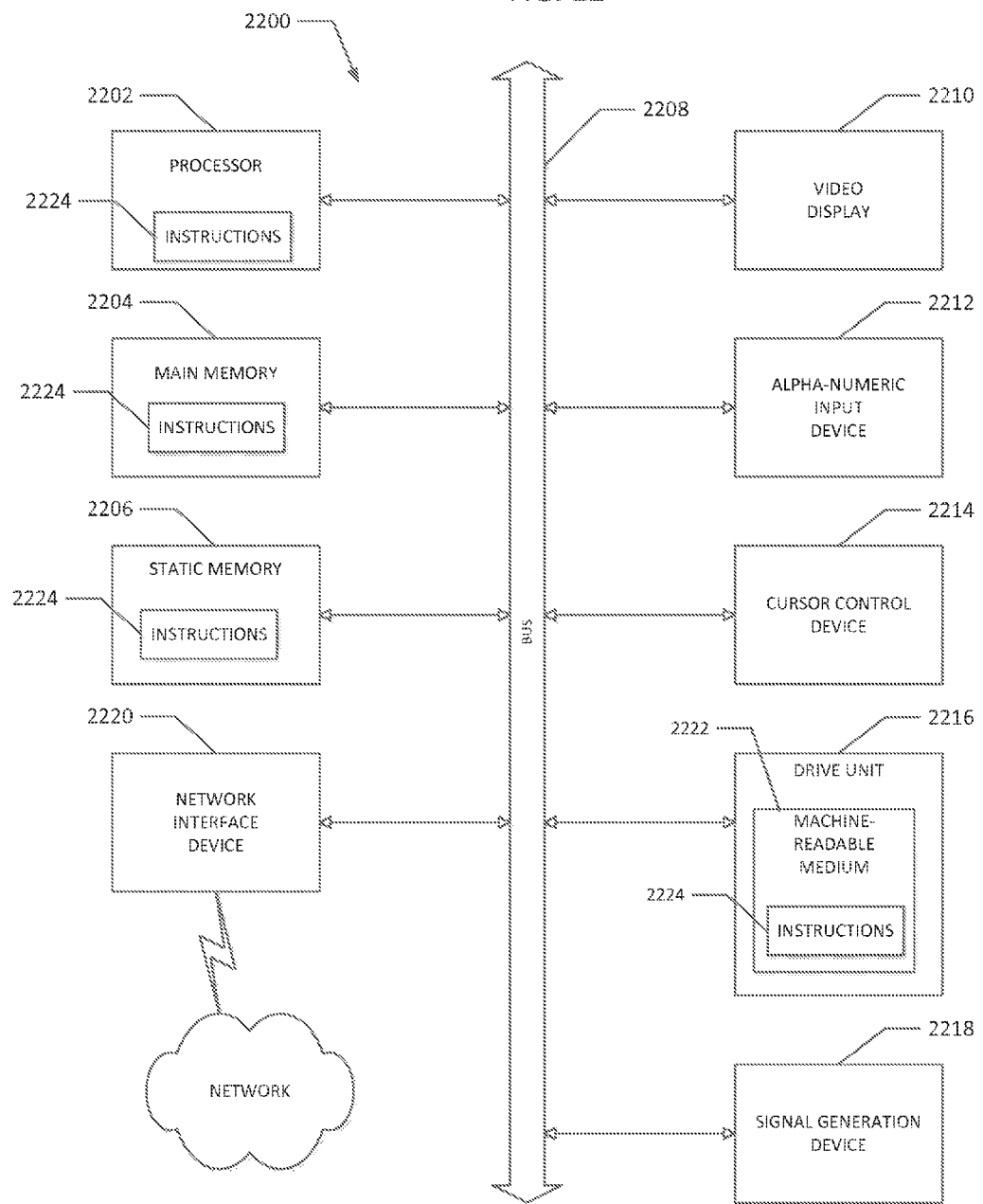
FIG. 22 is a block diagram of a computing device for executing the system in FIG. 1.

An example computer system 2200 in FIG. 22 includes a processor 2202 (e.g., a central processing unit (CPU), a graphics processing unit (GPU), or both), a main memory 2204, and a static memory 2206, which communicate with each other via a bus 2208. The computer system 2200 may further include a video display unit 2210 (e.g., a liquid crystal display (LCD) or a cathode ray tube (CRT)). The computer system 500 also includes an input device 2212 (e.g., a keyboard), a cursor control device 2214 (e.g., a mouse), a disk drive unit 2216, a signal generation device 2218 (e.g., a speaker), and a network interface device 2220.

The disk drive unit 2216 includes a machine-readable medium 2222 on which is stored one or more sets of instructions (e.g., software 2224) embodying any one or more of the methodologies or functions described herein. The instructions 2224 may also reside, completely or at least partially, within the main memory 2204, the static memory 2206, and/or within the processor 2202 during execution thereof by the computer system 2200. The main memory 2204 and the processor 2202 also may constitute machine-readable media. The instructions 2224 may further be transmitted or received over a network.

While the machine-readable medium is shown in an example to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding, or carrying a set of instructions for execution by the machine and that cause the machine to perform any one or more of the methodologies of the various embodiments, or that is capable of storing, encoding, or carrying data structures utilized by or associated with such a set of instructions. The term "machine-readable medium" can accordingly be taken to include, but not be limited to, solid-state memories, optical media, and magnetic media.

A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled in the art will readily observe that numerous modifications, applications and alterations of the device and method may be made while retaining the teachings of the present invention.

What is claimed is:

1. A method of personalized activity focused results based on a query relating to an activity submitted via a network from a user computing device, the activity including an action verb and a completion, the method comprising:
generating, by a search module operating on a query server, a first internet search index,
wherein generating the first internet search index further comprises:
gathering information concerning a plurality of web pages from the Internet using a web crawler; and
generating the first internet search index using the gathered information;
populating, at the query server, a database schema associating a plurality of action verb infinitives with a plurality of user interests of a user, wherein populating the database schema further comprises:
receiving, at the query server, user interest data including text describing the plurality of user interests, the text including a plurality of verbs;

generating, by an action verb generator, the plurality of action verb infinitives using the plurality of verbs;

identifying, by the action verb generator, a plurality of verb-interest associations, the plurality of associations associating each action verb infinitive of the plurality of action verb infinitives with at least one of the plurality of user interests; and storing, in the database schema, the plurality of action verb infinitives and the plurality of verb-interest associations;

generating, at the query server, a user-specific search index, wherein generating the user-specific search index further comprises:

identifying, in the first internet search index, a plurality of associations between each of the plurality of web pages and each of the plurality of user interests; and generating the user-specific search index combining the first internet search index with the plurality of associations between each of the plurality of web pages and each of the plurality of user interests;

receiving at the query server the query relating to the activity from the user computing device via a network, the query including at least one query action verb;

searching the database schema for action verb infinitives associated with the at least one query action verb and at least one attribute type associated with the at least one query action verb;

retrieving from the database schema at least one user interest using at least one association of the plurality of verb-interest associations;

retrieving from the user-specific index at least one web page associated with the at least one user interest, the at least one web page including a resulting activity;

sending the at least one web page, the associated action verb infinitives, and the at least one attribute type to the user computing device via the network;

sending completion data including a guidance designated by at least one other user related to the activity stored in the database to the user computing device associated with the resulting activity via the network;

displaying the completion data to the user on the user computing device;

accepting an input from the user to complete the activity based on the completion data; and storing completion criteria associated with the user in the database to track the completion of the activity.

2. The method of claim 1, wherein the at least one attribute type is selected from skills, topics, interests, people, locations, products and services, and focus areas.

3. The method of claim 1, wherein the database schema is populated using data from the user.

4. The method of claim 1, wherein the database schema is populated using data from a web-crawler application.

5. The method of claim 1, wherein the at least one attribute type has its own structured data.

6. The method of claim 1, wherein the at least one attribute type is ranked according to attribute rank.

7. The method of claim 1, wherein the guidance includes a ranking.

8. The method of claim 7, wherein the guidance ranking is multi-dimensional including a guidance type and engagement by the user.

9. The method of claim 8, wherein the engagement by the user is measured by user personal preference.

10. The method of claim 1, wherein the user computing device accepts an entry from the user of a user interest.

11. The method of claim 10, wherein the entry from the user includes a categorization of the user interest by a skill level.

12. The method of claim 11, wherein the categorization includes at least one of a personal interest, a professional interest, a hobby interest, an exploring interest, an educational interest and a mentoring interest.

13. The method of claim 1, further comprising assigning a guidance rank to a web page.

14. The method of claim 13, wherein the guidance rank includes a usability rank based on users of the web page, a social rank based on a rating of the web page and a guidance creator rank based on the skill of a creator of the web page.

15. The method of claim 1, further comprising providing a hub associated with the activity, the hub including a skill level associated with the activity and user data relating to other users associated with the activity.

16. The method of claim 15, wherein the hub includes a to-do list including the activity and allowing the user to schedule time on subjects associated with the hub.

17. The method of claim 15, wherein the hub includes a project guide that includes the related guidance.

18. The method of claim 1, further comprising allowing the user to create a team of users associated with the activity to collaborate on a project associated with the activity.

19. The method of claim 18, wherein if the at least one action verb is not found in the database, the user may add an activity with the at least one action verb and attribute to the database.

20. The method of claim 1, further comprising generating an action verb from at least one of a request by a user and a web-crawler application.

21. The method of claim 1, further comprising:
accepting an entry from the user to indicate the completion of the activity; and
broadcasting the completion of the activity to another user.

22. The method of claim 1, wherein the user computing device displays an activity graph including data spent by the user on the activity.

23. The method of claim 22, wherein the user computing device displays data spent by the user on another activity.

24. The method of claim 1, further comprising accepting an entry from the user to create an even card associated with the activity, and wherein the user display device displays the event card.

25. The method of claim 24, wherein the event card includes a title, a date, a location, a description, and the associated activity.

26. The method of claim 25, further comprising accepting prerequisites from the user in relation to the activity.

27. A system for providing activity data for a user, comprising:
a network;
a user computing device having a user interface, a controller, and a communication interface allowing communication with the network;
a database schema coupled to the network, the database schema including action verbs associated action verb infinitives, a plurality of user interests of a user, a plurality of associations associating each action verb infinitive of the plurality of action verb infinitives with at least one of the plurality of user interests, and attribute types, the database storing guidances submitted by the users related to at least one action verb;
a query server coupled to the network, the query server configured to:

generate a first internet search index, wherein generating the first internet search index further comprises:
  gathering information concerning a plurality of web pages from the Internet using a web crawler; and
  generating the first internet search index using the gathered information;
populate the database schema, wherein populating the database schema further comprises:
  receiving user interest data including text describing the plurality of user interests, the text including a plurality of verbs;
  generating the plurality of action verb infinitives using the plurality of verbs;
  identifying the plurality of verb-interest associations, the plurality of associations associating each action verb infinitive of the plurality of action verb infinitives with at least one of the plurality of user interests; and
  storing, in the database schema, the plurality of action verb infinitives and the plurality of verb-interest associations;
generate a user-specific search index, wherein generating the user-specific search index further comprises:
  identifying, in the first internet search index, a plurality of associations between each of the plurality of web pages and each of the plurality of user interests; and
  generating the user-specific search index combining the first internet search index with the plurality of associations between each of the plurality of web pages and each of the plurality of user interests;
receive a query relating to an activity submitted from the user computing device, the query including at least one query action verb and a completion;
search the database schema for action verb infinitives associated with the at least one query action verb and at least one attribute type associated with the at least one query action verb;
retrieve from the database schema at least one user interest using at least one association of the plurality of verb-interest associations;
retrieve from the user-specific index at least one web page associated with the at least one user interest, the at least one web page including a resulting activity;
send the at least one web page, the associated action verb infinitives, and the at least one attribute type to the user computing device via the network; and
send completion data including a guidance designated by at least one other user related to the activity stored in the database to the user computing device associated with the resulting activity via the network;
wherein the user computing device is configured to:
  display the completion data to the user on the user computing device;
  accept an input from the user to complete the activity based on the completion data; and
  request the server store completion criteria associated with the user in the database to track the completion of the activity.

28. The system of claim 27, wherein the attribute types include skills, topics, interests, people, locations, products and services and focus areas.

29. The system of claim 27, wherein each of the attribute types has its own structured data.

30. The system of claim 27, wherein each of the attributed types is ranked using an attribute rank.

31. The system of claim 27, wherein each guidance includes a ranking.

32. The system of claim 31, wherein the guidance ranking is multi-dimensional including a guidance type and engagement by the user.

33. The system of claim 32, wherein the engagement by the user is measured by user personal preference.

34. The system of claim 27, wherein the user computing device is configured to accept an entry by a user of a user interest.

35. The system of claim 34, wherein the entry by the user of the user interest includes a categorization of the user interest by a skill level.

36. The system of claim 35, wherein the categorization includes at least one of a personal interest, a professional interest, a hobby interest, an exploring interest, an educational interest and a mentoring interest.

37. The system of claim 27, wherein the server is further configured to assign a guidance rank to a web page.

38. The system of claim 37, wherein the guidance rank includes a usability rank based on users of the web page, a social rank based on a rating of the web page, and a guidance creator rank based on the skill of a creator of the web page.

39. The system of claim 27, wherein the server is further configured to provide a hub associated with the activity, the hub including a skill level associated with the activity and user data relating to other users associated with the activity.

40. The system of claim 39, wherein the hub includes a to-do list including the activity and allowing the user to schedule time on subjects associated with the hub.

41. The system of claim 39, wherein the hub includes a project guide that includes the related guidance.

42. The system of claim 27, wherein the server is configured to allow the user to create a team of users associated with the activity to collaborate on a project associated with the activity.

43. The system of claim 42, wherein if the server does not find the at least one action verb in the database schema, the user is able to add an activity with the at least one action verb and at least one attribute type to the database.

44. The system of claim 27, wherein the server is configured to allow the generation of a new action verb from at least one of a user request and a a web-crawler application.

45. The system of claim 27, wherein the server is further configured to accept an entry from the user to indicate the completion of the activity and the server is further configured to broadcast the completion of the activity to another user.

46. The system of claim 27, wherein the user computing device is further configured to display an activity graph including data spent by the user on the activity.

47. The system of claim 46, wherein the user computing device is further configured to display data spent by the user on another activity.

48. The system of claim 27, wherein the server is further configured to accept an entry from the user to create an event card associated with the activity, and wherein the user display device is further configured to display the event card.

49. The system of claim 48, wherein the event card includes a title, a date, a location, a description and the associated activity.

50. The system of claim 49, wherein the server is further configured to accept prerequisites from the user in relation to the activity.

* * * * *